(12) United States Patent
Bang et al.

(10) Patent No.: US 11,084,011 B2
(45) Date of Patent: Aug. 10, 2021

(54) ANNEALING METHOD AND NITROGEN-DOPED METAL OXIDE STRUCTURE

(71) Applicant: INDUSTRY-UNIVERSITY COOPERATION FOUNDATION HANYANG UNIVERSITY ERICA CAMPUS, Ansan-si (KR)

(72) Inventors: Jin Ho Bang, Ansan-si (KR); Sang Uck Lee, Bucheon-si (KR); Lanlee Lee, Ansan-si (KR); Suyoung Han, Ansan-si (KR); Byung Wuk Kang, Anyang-si (KR); Heeeun Kim, Daegu (KR)

(73) Assignee: INDUSTRY-UNIVERSITY COOPERATION FOUNDATION HANYANG UNIVERSITY ERICA CAMPUS, Ansan-si (KR)

( * ) Notice: Subject to any disclaimer, the term of this patent is extended or adjusted under 35 U.S.C. 154(b) by 118 days.

(21) Appl. No.: 16/205,514

(22) Filed: Nov. 30, 2018

(65) Prior Publication Data
US 2019/0097227 A1    Mar. 28, 2019

Related U.S. Application Data

(63) Continuation of application No. PCT/KR2017/005699, filed on May 31, 2017.

(30) Foreign Application Priority Data

May 31, 2016 (KR) .................. 10-2016-0067798
May 31, 2016 (KR) .................. 10-2016-0067804
May 24, 2017 (KR) .................. 10-2017-0063896

(51) Int. Cl.
*B01J 6/00* (2006.01)
*C01G 51/04* (2006.01)
(Continued)

(52) U.S. Cl.
CPC ............... *B01J 6/00* (2013.01); *C01G 23/08* (2013.01); *C01G 31/02* (2013.01); *C01G 33/00* (2013.01);
(Continued)

(58) Field of Classification Search
CPC ...... H01B 1/06; H01B 1/08; B01J 6/00; B01J 6/001; C01B 21/06; C01B 21/0602;
(Continued)

(56) References Cited

U.S. PATENT DOCUMENTS 5,211,921 A * 5/1993 Sommers ............... C01G 31/02
423/138
5,707,599 A * 1/1998 Northway .......... C01G 23/0475
423/594.17
(Continued)

FOREIGN PATENT DOCUMENTS

KR    10-2008-0092663 A    10/2008
KR    10-2012-0021716 A    3/2012
(Continued)

OTHER PUBLICATIONS

Adriana Zaleska, "Doped-TiO2: A Review", Recent Patents on Engineering, Nov. 2008, pp. 157-164, vol. 2.
(Continued)

*Primary Examiner* — Matthew R Diaz
(74) *Attorney, Agent, or Firm* — Sughrue Mion, PLLC

(57) ABSTRACT

An annealing method is provided. The annealing method includes preparing a metal oxide structure, annealing the metal oxide structure in a gas atmosphere including nitrogen to fabricate a metal compound structure, an oxygen content of which is lower than that of the metal oxide structure, from the metal oxide structure, and annealing the metal compound structure in a gas atmosphere including oxygen to fabricate a nitrogen-doped metal oxide structure, which has
(Continued)

a specific surface area greater than that of the metal oxide structure, from the metal compound structure.

7 Claims, 46 Drawing Sheets

(51) Int. Cl.

| | |
|---|---|
| *C01G 55/00* | (2006.01) |
| *H01B 1/08* | (2006.01) |
| *H01M 4/525* | (2010.01) |
| *C01G 39/02* | (2006.01) |
| *C01G 35/00* | (2006.01) |
| *C01G 31/02* | (2006.01) |
| *C01G 33/00* | (2006.01) |
| *C01G 41/02* | (2006.01) |
| *C01G 49/06* | (2006.01) |
| *C01G 23/08* | (2006.01) |
| *H01B 1/06* | (2006.01) |
| *H01M 4/02* | (2006.01) |
| *H01M 10/0525* | (2010.01) |
| *H01M 10/052* | (2010.01) |
| *H01M 4/48* | (2010.01) |
| *H01M 4/52* | (2010.01) |

(52) U.S. Cl.
CPC ............ *C01G 35/00* (2013.01); *C01G 39/02* (2013.01); *C01G 41/02* (2013.01); *C01G 49/06* (2013.01); *C01G 51/04* (2013.01); *C01G 55/004* (2013.01); *H01B 1/06* (2013.01); *H01B 1/08* (2013.01); *H01M 4/525* (2013.01); *C01P 2002/54* (2013.01); *C01P 2002/70* (2013.01); *C01P 2002/72* (2013.01); *C01P 2002/77* (2013.01); *C01P 2002/85* (2013.01); *C01P 2004/03* (2013.01); *C01P 2004/04* (2013.01); *C01P 2004/64* (2013.01); *C01P 2006/12* (2013.01); *C01P 2006/14* (2013.01); *C01P 2006/40* (2013.01); *H01M 4/483* (2013.01); *H01M 4/523* (2013.01); *H01M 10/052* (2013.01); *H01M 10/0525* (2013.01); *H01M 2004/028* (2013.01)

(58) Field of Classification Search
CPC ............ C01B 21/0615; C01B 21/0617; C01B 21/21062; C01B 21/0622; C01B 21/076; C01B 21/0761; C01B 21/082; C01B 21/0823; C30B 29/16; C30B 29/38; C30B 31/06; C30B 31/08; C30B 31/12; C30B 33/005; C30B 33/02; C21D 1/26; C01G 23/047; C01G 23/08; C01G 31/02; C01G 33/00; C01G 35/00; C01G 39/02; C01G 41/02; C01G 49/06; C01G 51/04; C01P 2002/54; C01P 55/004
See application file for complete search history.

(56) References Cited

U.S. PATENT DOCUMENTS

| | | | | |
|---|---|---|---|---|
| 5,776,264 | A | * | 7/1998 | McCandlish ............ B22F 9/22 148/237 |
| 7,285,188 | B2 | * | 10/2007 | Gole ...................... B01J 23/74 204/157.41 |
| 8,029,762 | B2 | * | 10/2011 | Schnitter ................ C01G 33/00 423/594.17 |
| 9,120,088 | B2 | * | 9/2015 | Li ............................ B01J 21/063 |
| 2006/0210798 | A1 | * | 9/2006 | Burda .................. C01G 23/047 423/610 |
| 2008/0260612 | A1 | * | 10/2008 | McHugh ................ C01G 53/04 423/252 |

FOREIGN PATENT DOCUMENTS

| | | |
|---|---|---|
| KR | 10-2012-0032803 A | 4/2012 |
| KR | 10-2015-0102402 A | 9/2015 |
| KR | 10-1597585 B1 | 2/2016 |

OTHER PUBLICATIONS

Xiufang Chen, et al., "The effect of postnitridation annealing on the surface property and photocatalytic performance of N-doped TiO2 under visible light irradiation", Journal of Catalysis, 2008, pp. 59-67, vol. 255.
International Search Report for PCT/KR2017/005699 dated Aug. 30, 2017 [PCT/ISA/210].

* cited by examiner

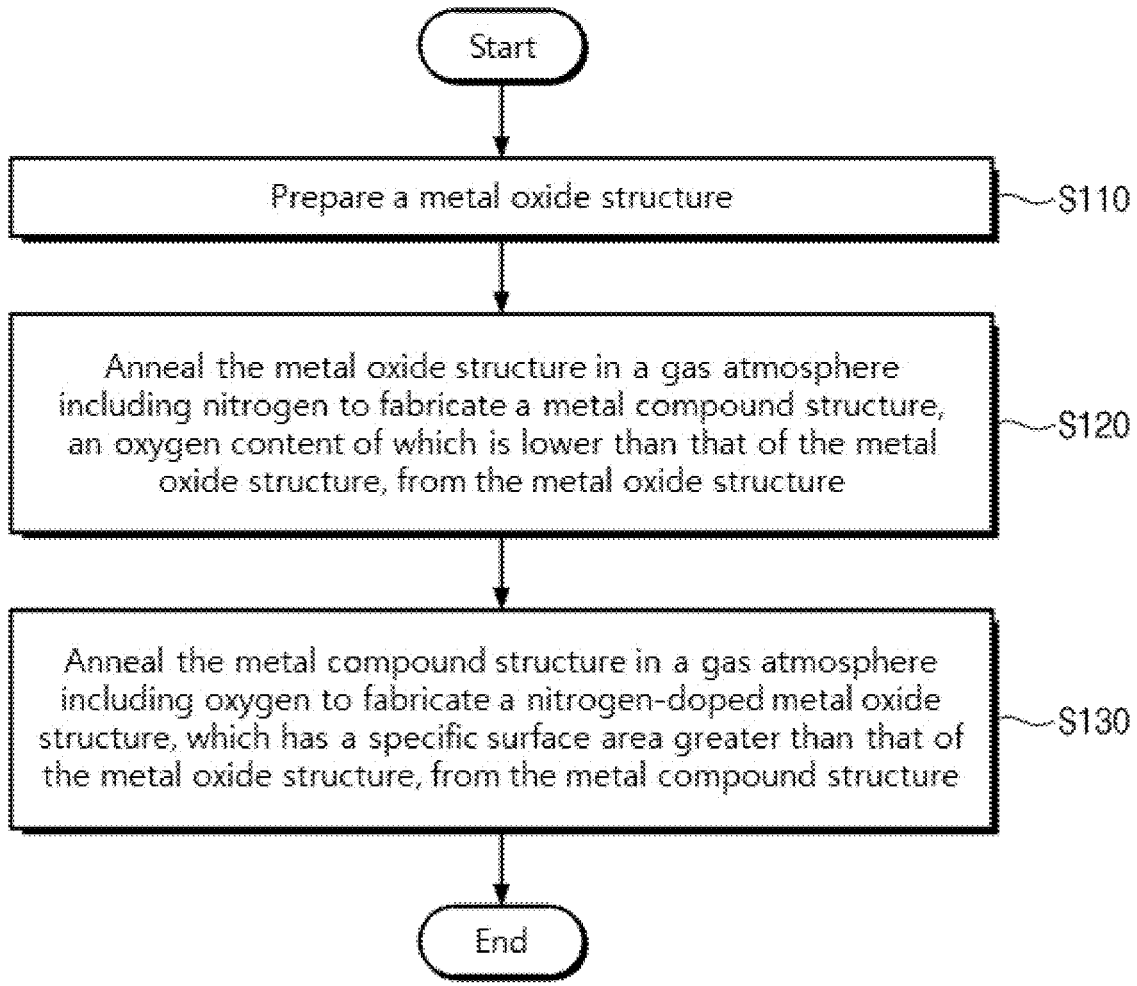
[Fig. 1]

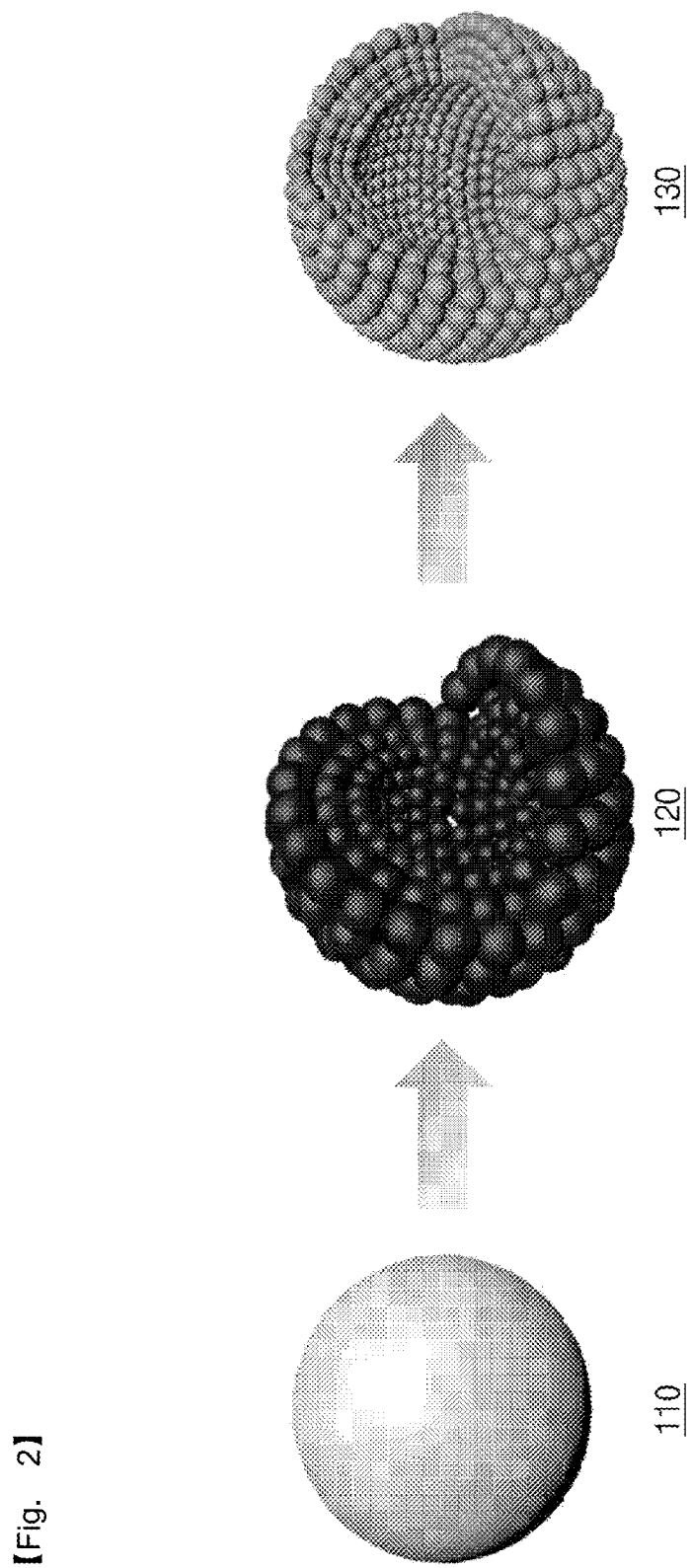
[Fig. 2]

[Fig. 3]
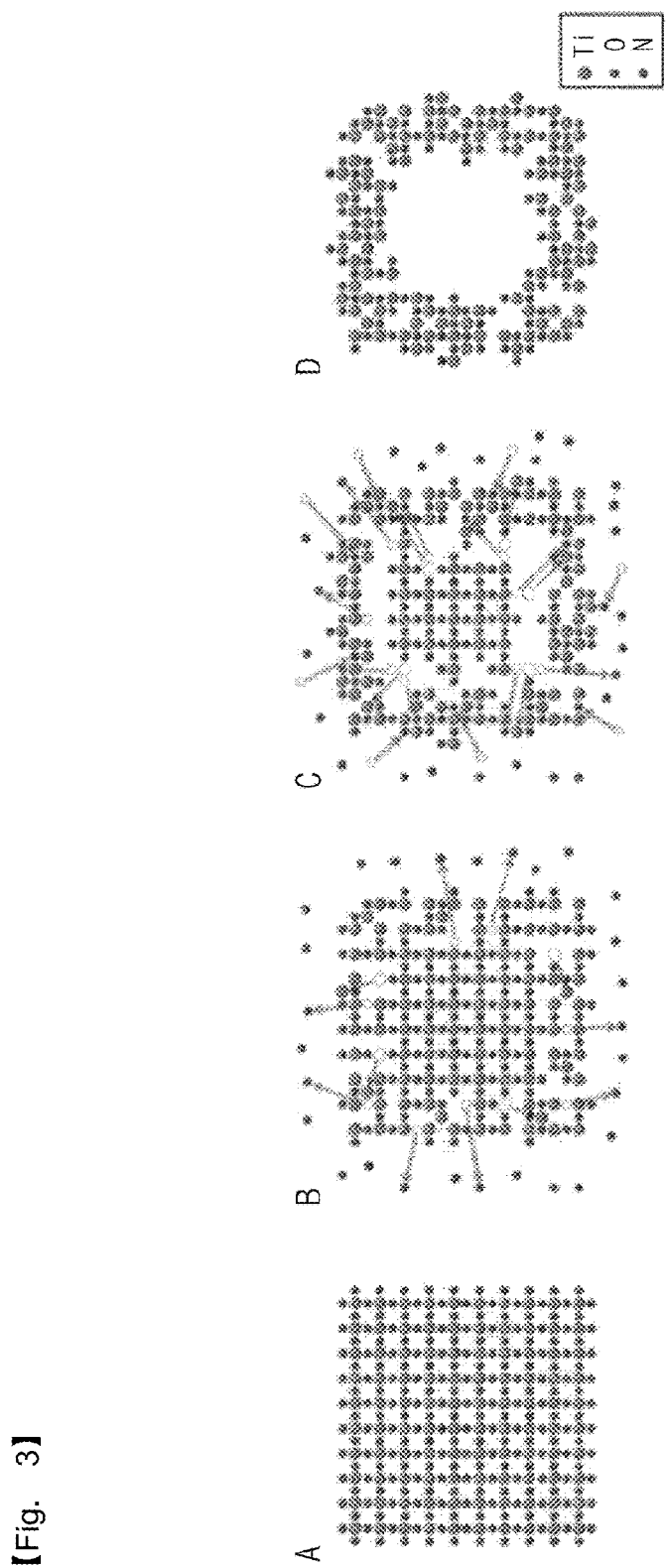

[Fig. 4]
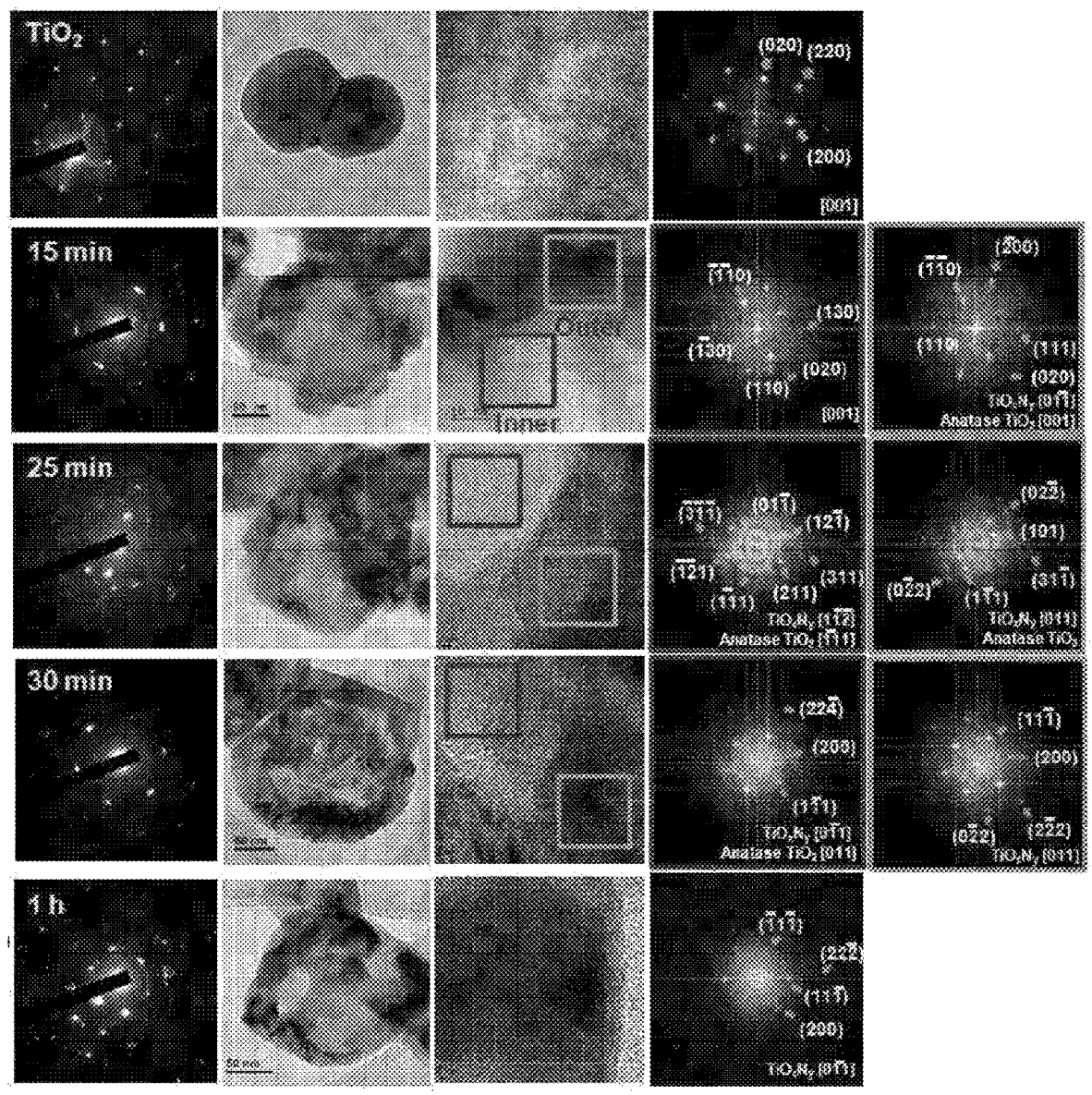

[Fig. 5]
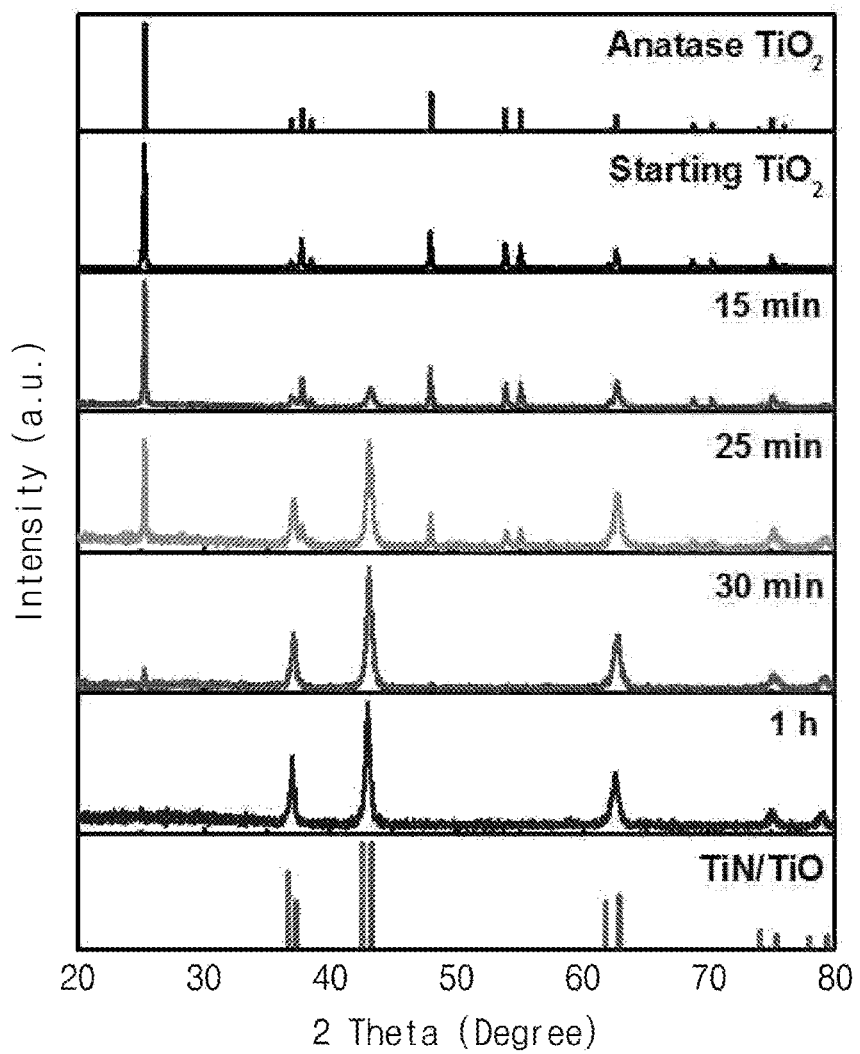

[Fig. 6]
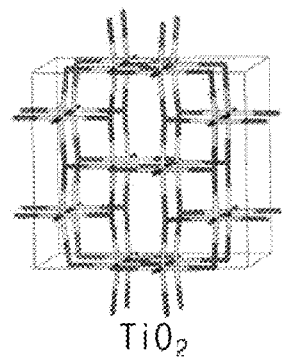
TiO$_2$
Ti migration
+ O$_2$ evolution
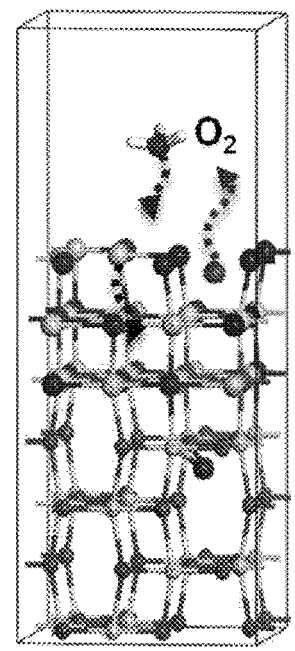
N substitution
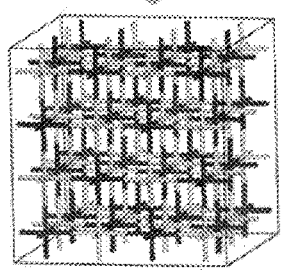
TiO$_x$N$_y$

[Fig. 7]
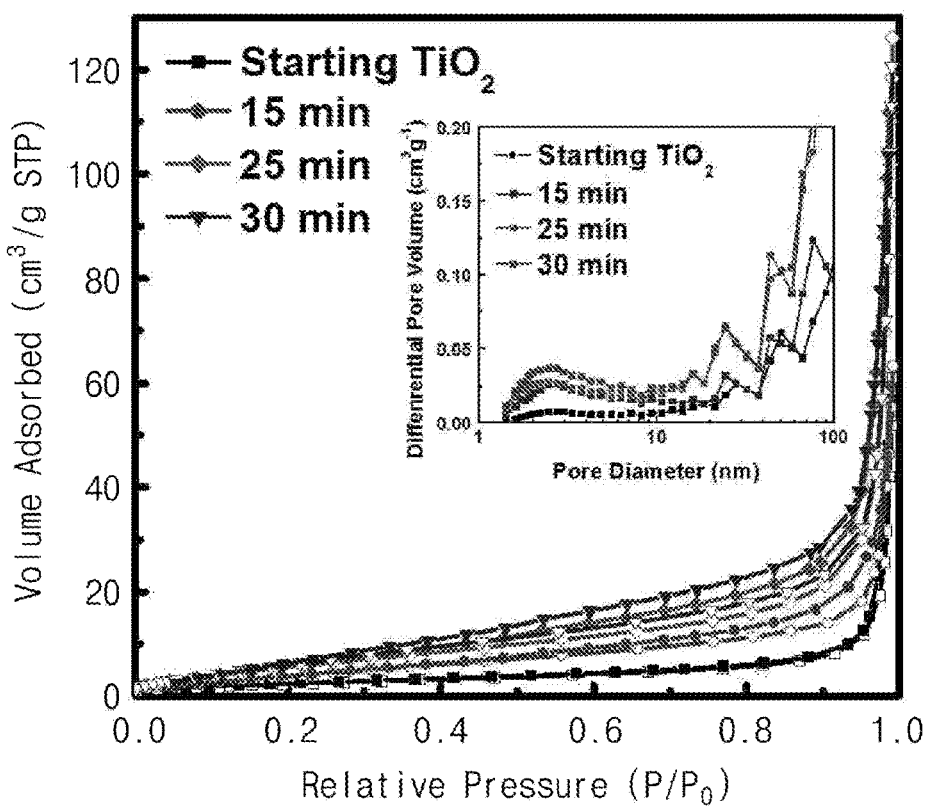

[Fig. 8]
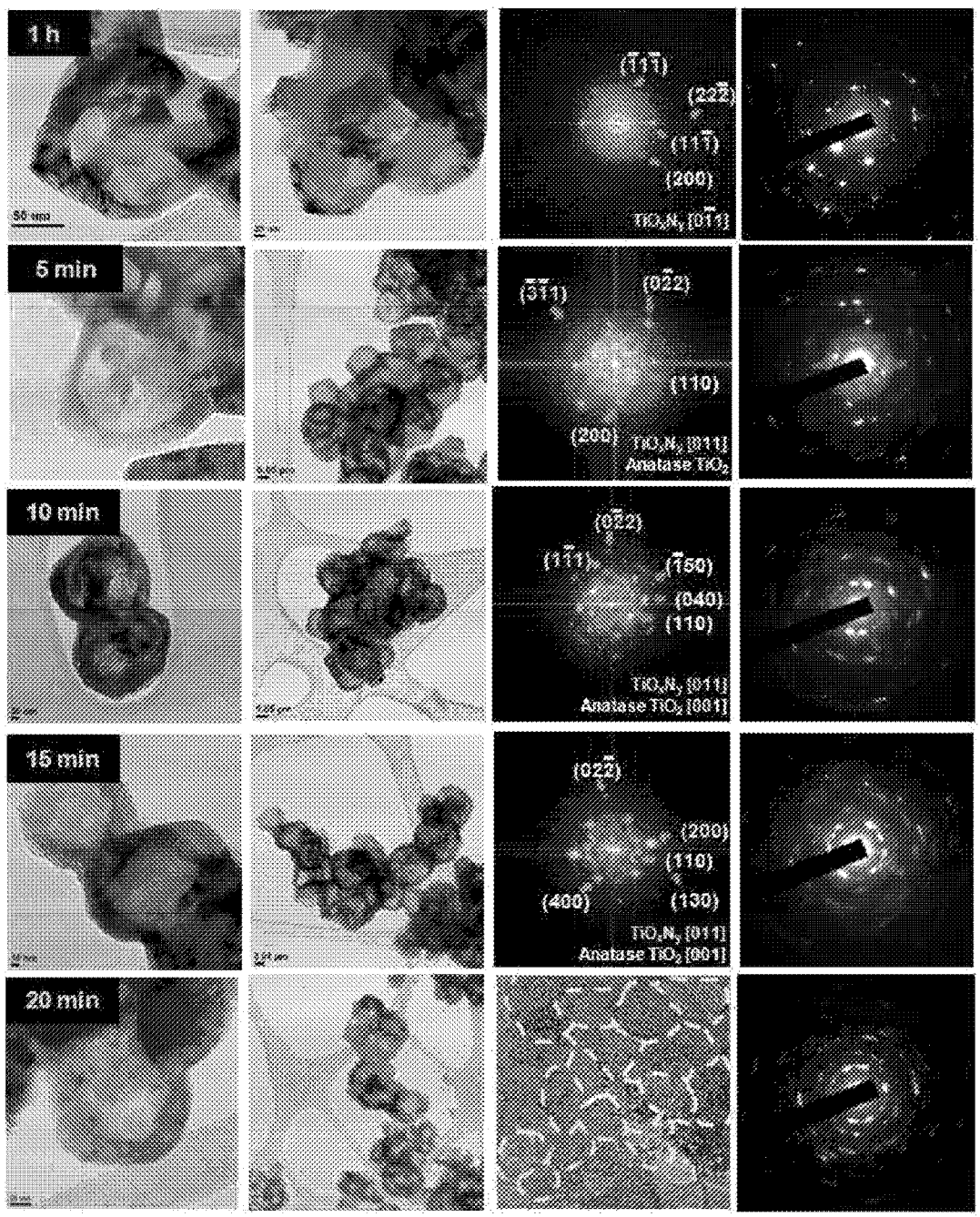

[Fig. 9]
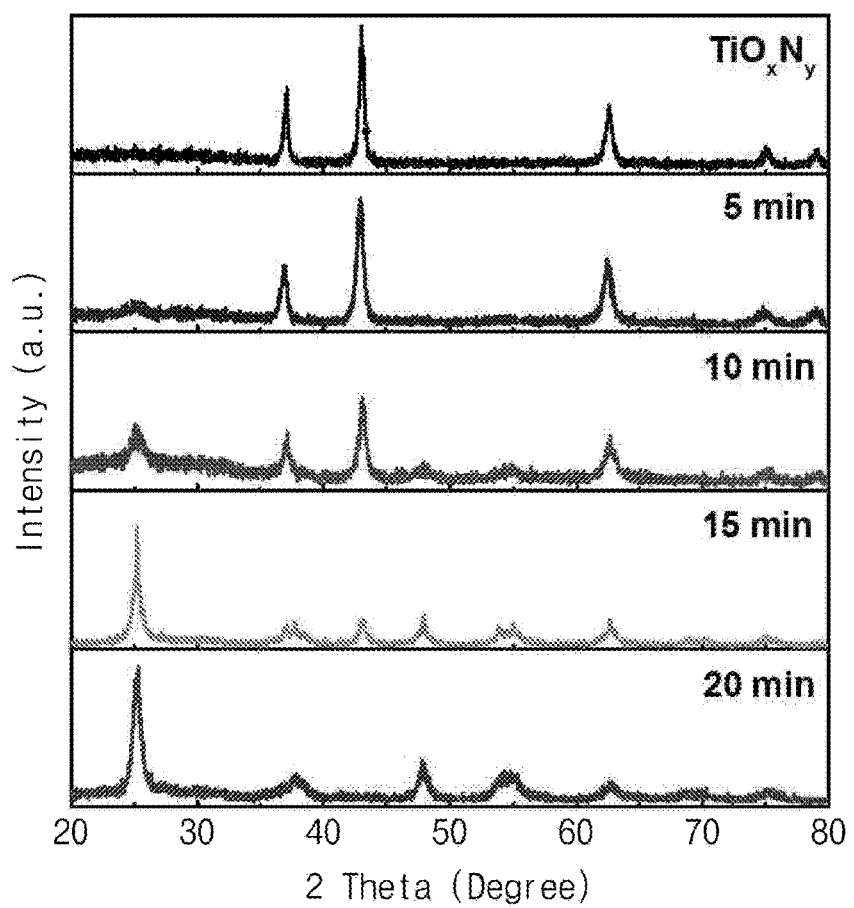

[Fig. 10]
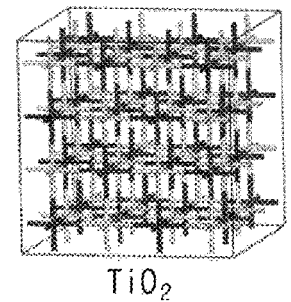
TiO$_2$
Ti migration
+ O$_2$ evolution
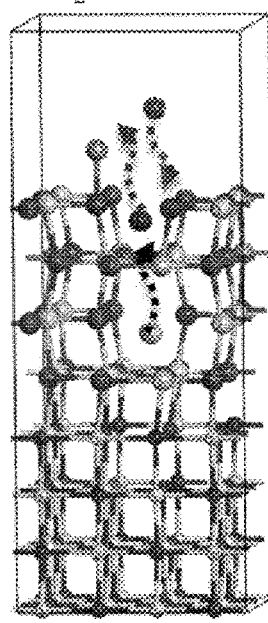
N substitution
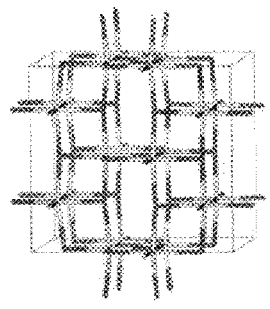
TiO$_x$N$_y$

[Fig. 11]
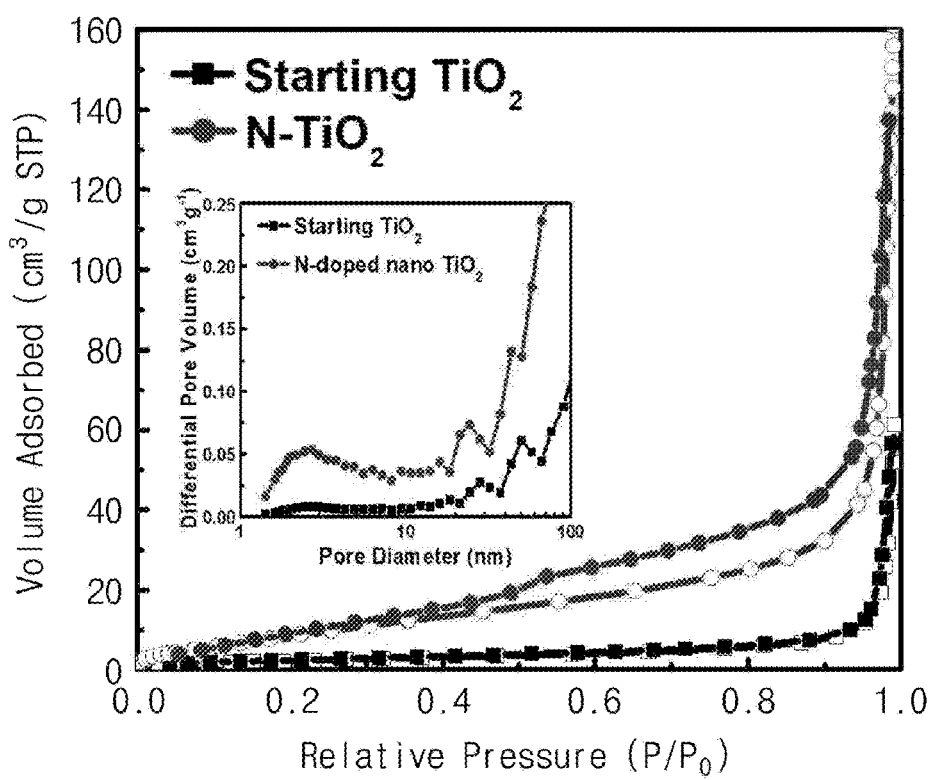

[Fig. 12]
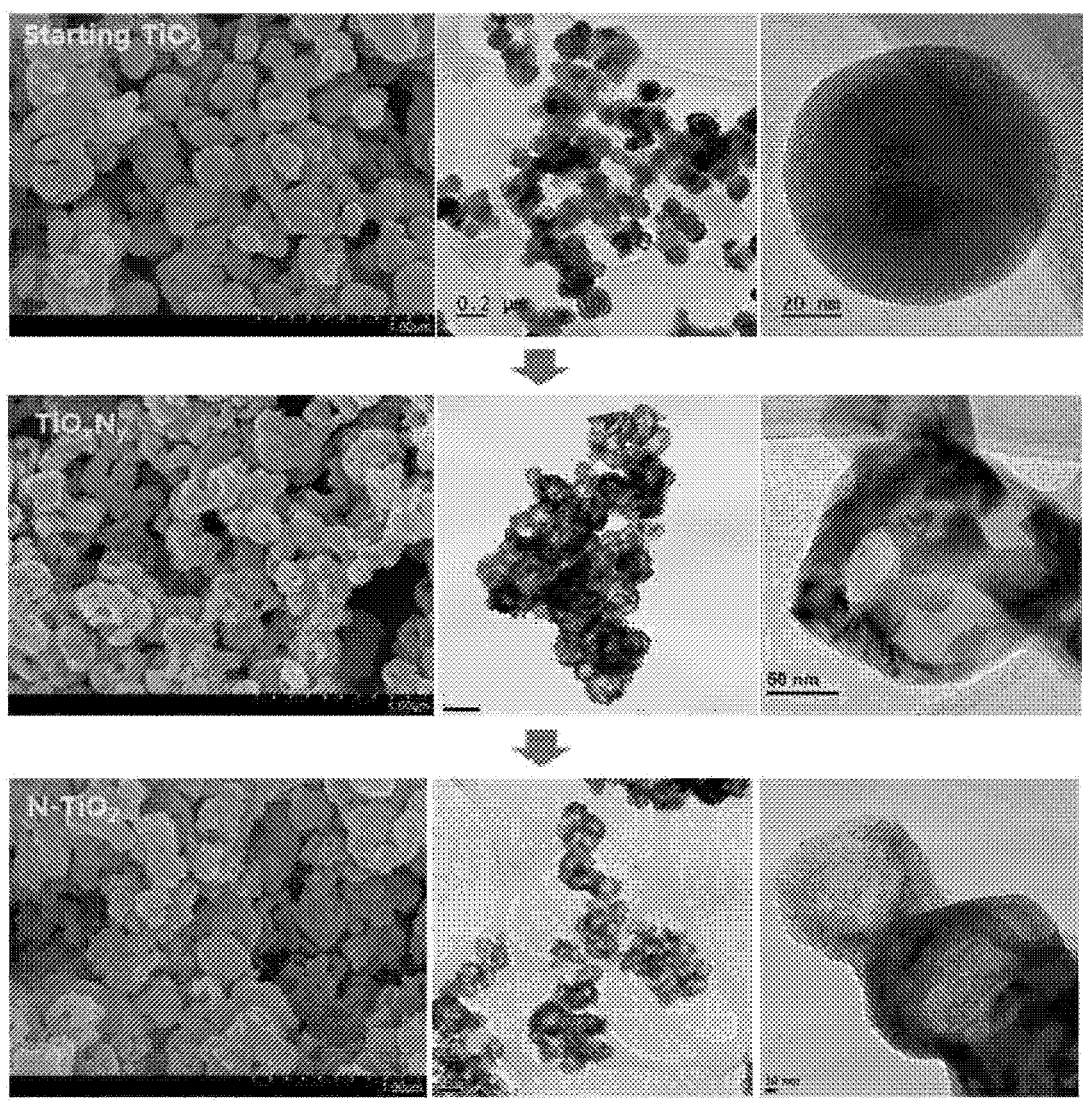

[Fig. 13]
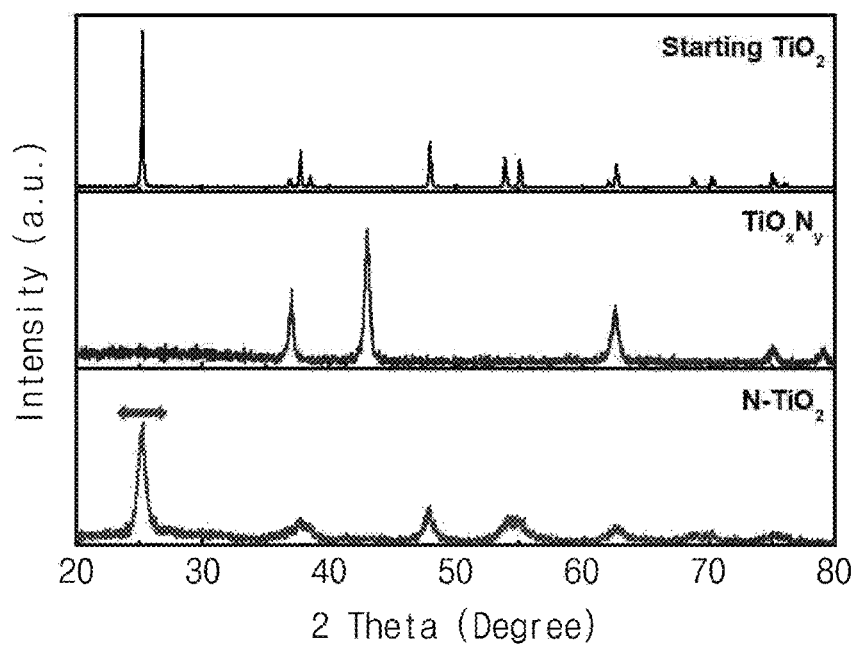

[Fig. 14]
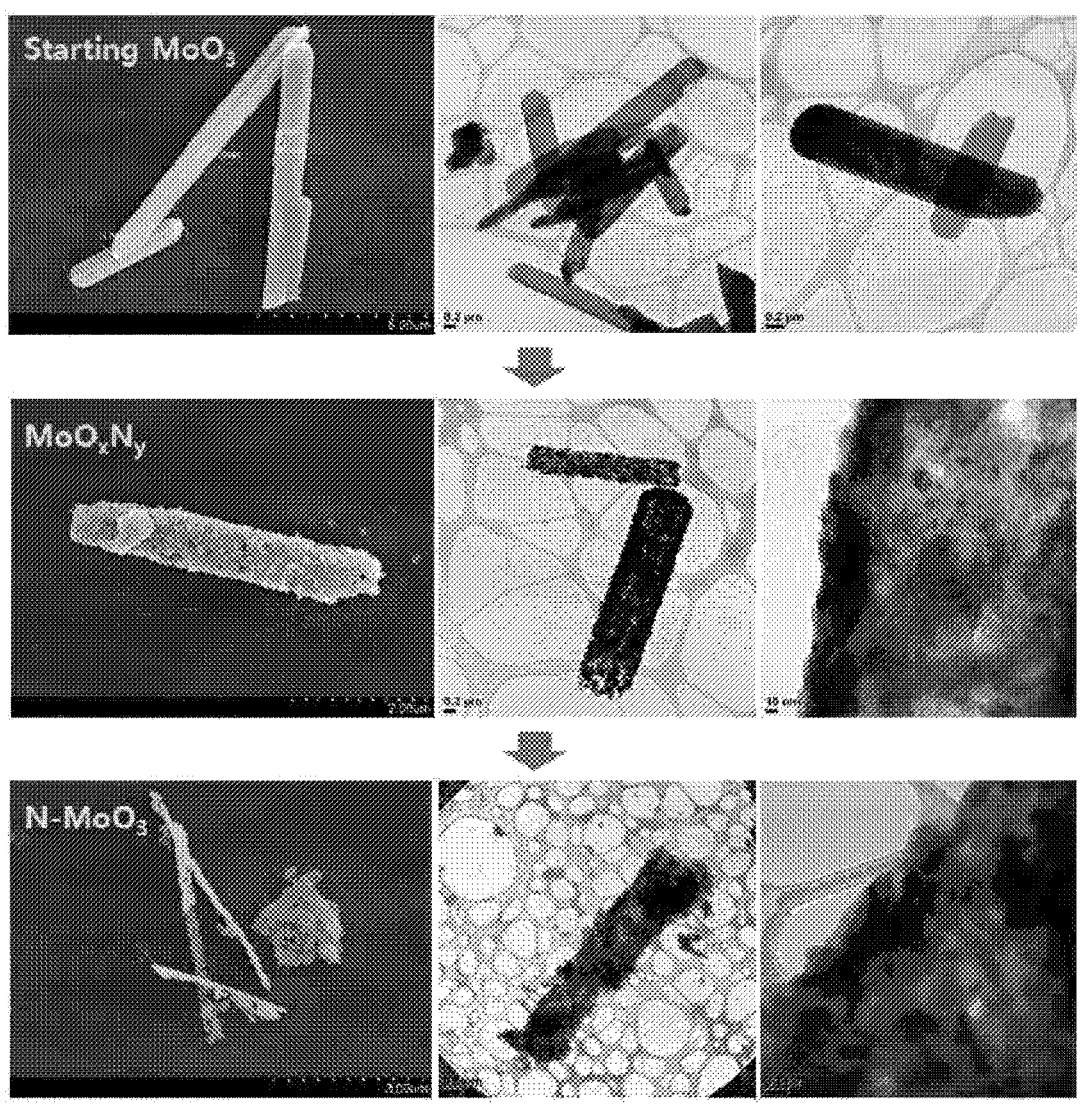

[Fig. 15]
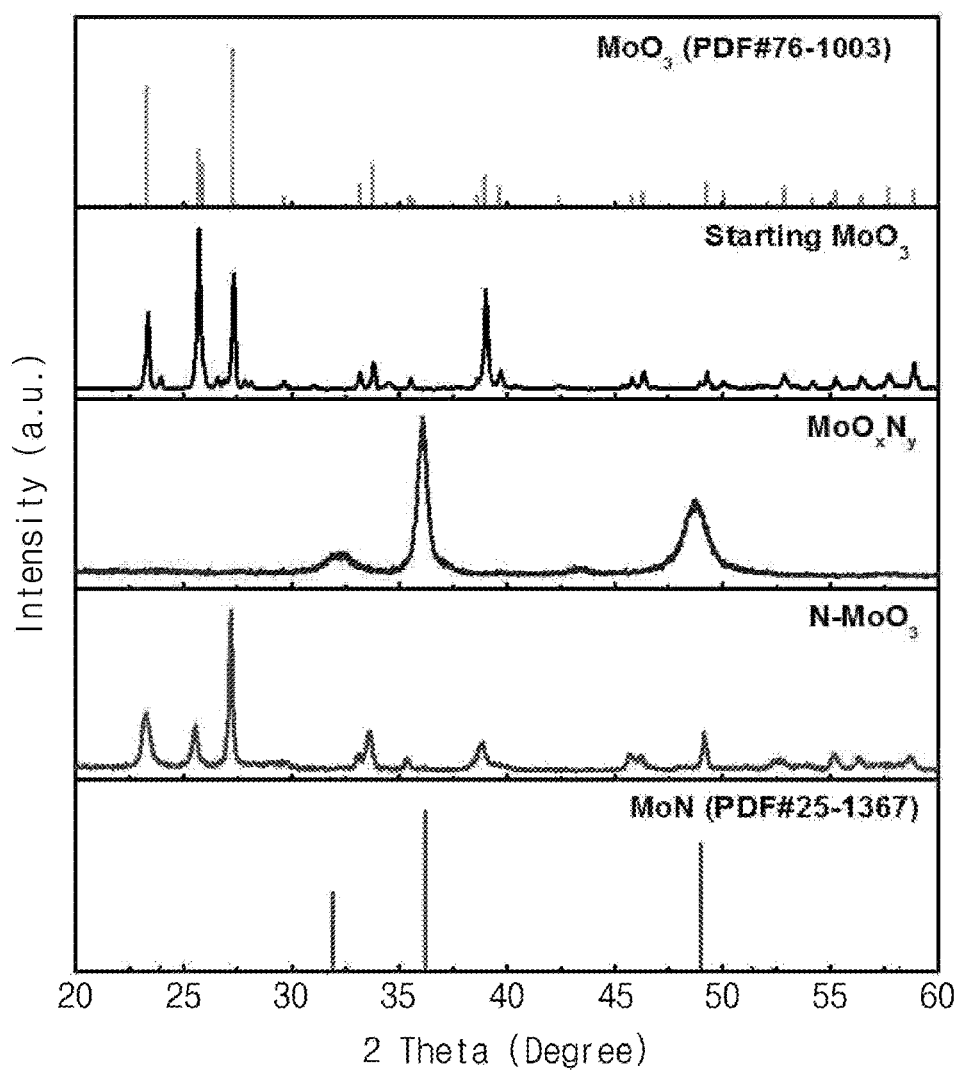

[Fig. 16]
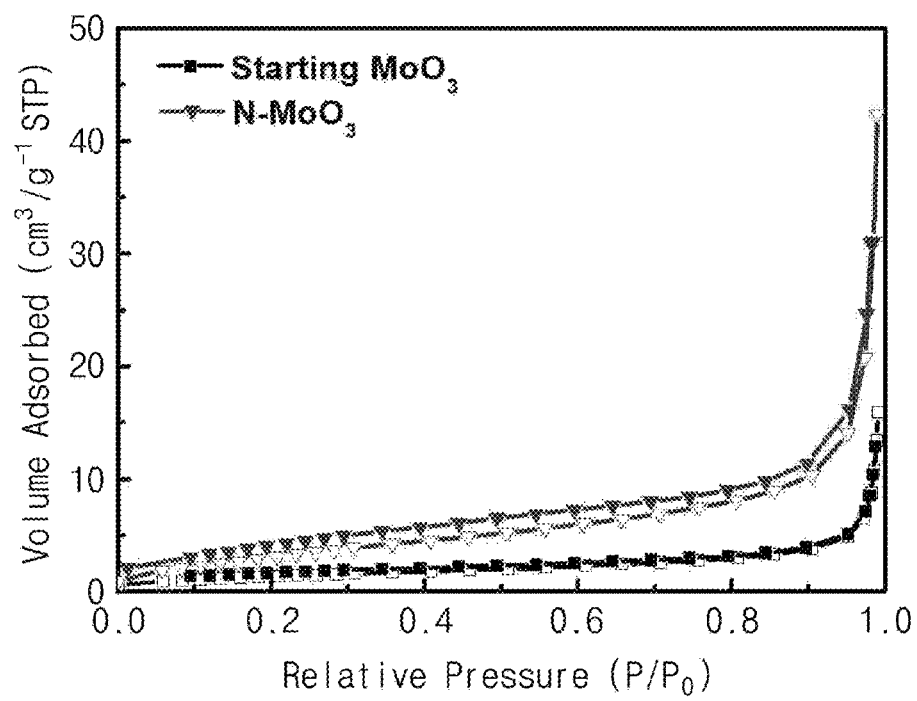

[Fig. 17]
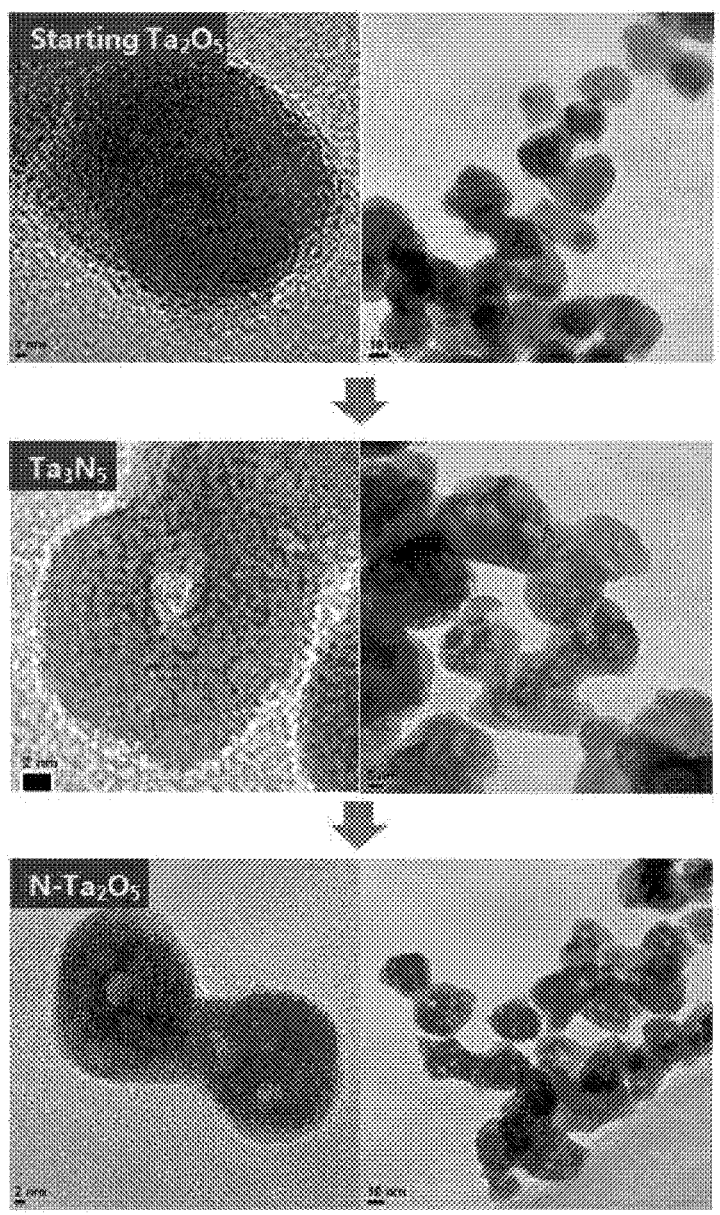

[Fig. 18]
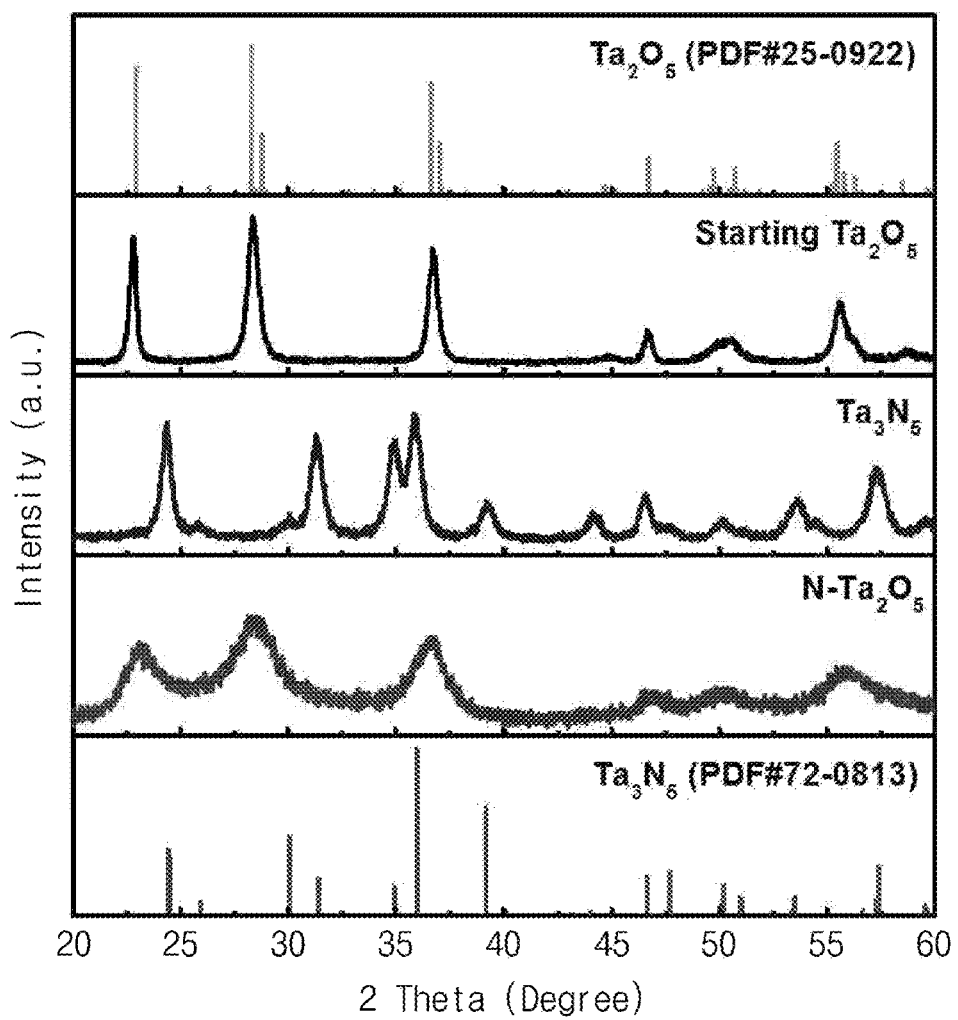

[Fig. 19]
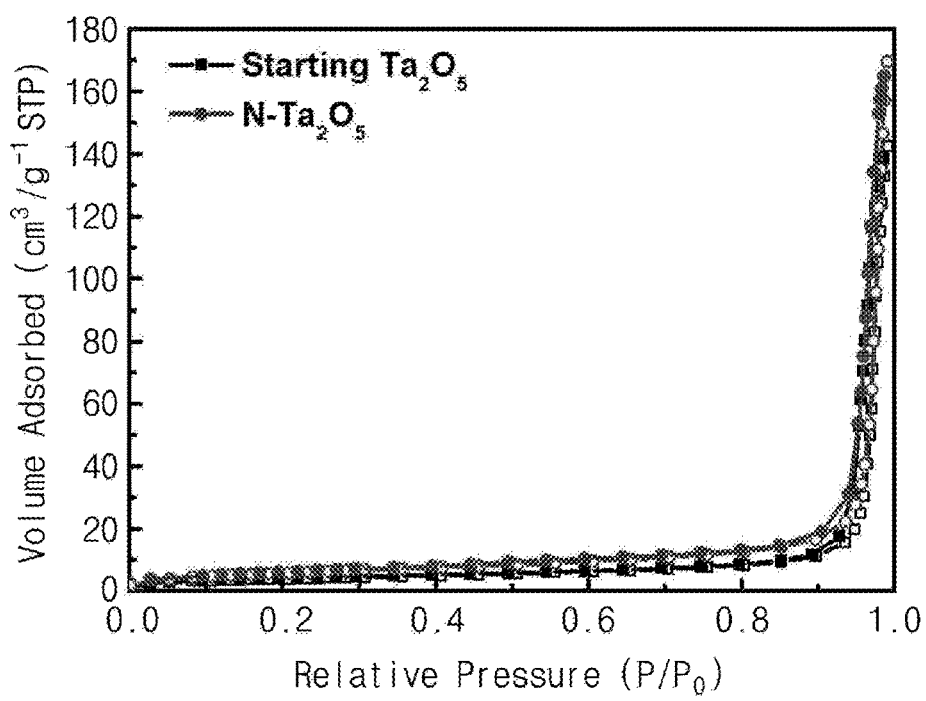

[Fig. 20]
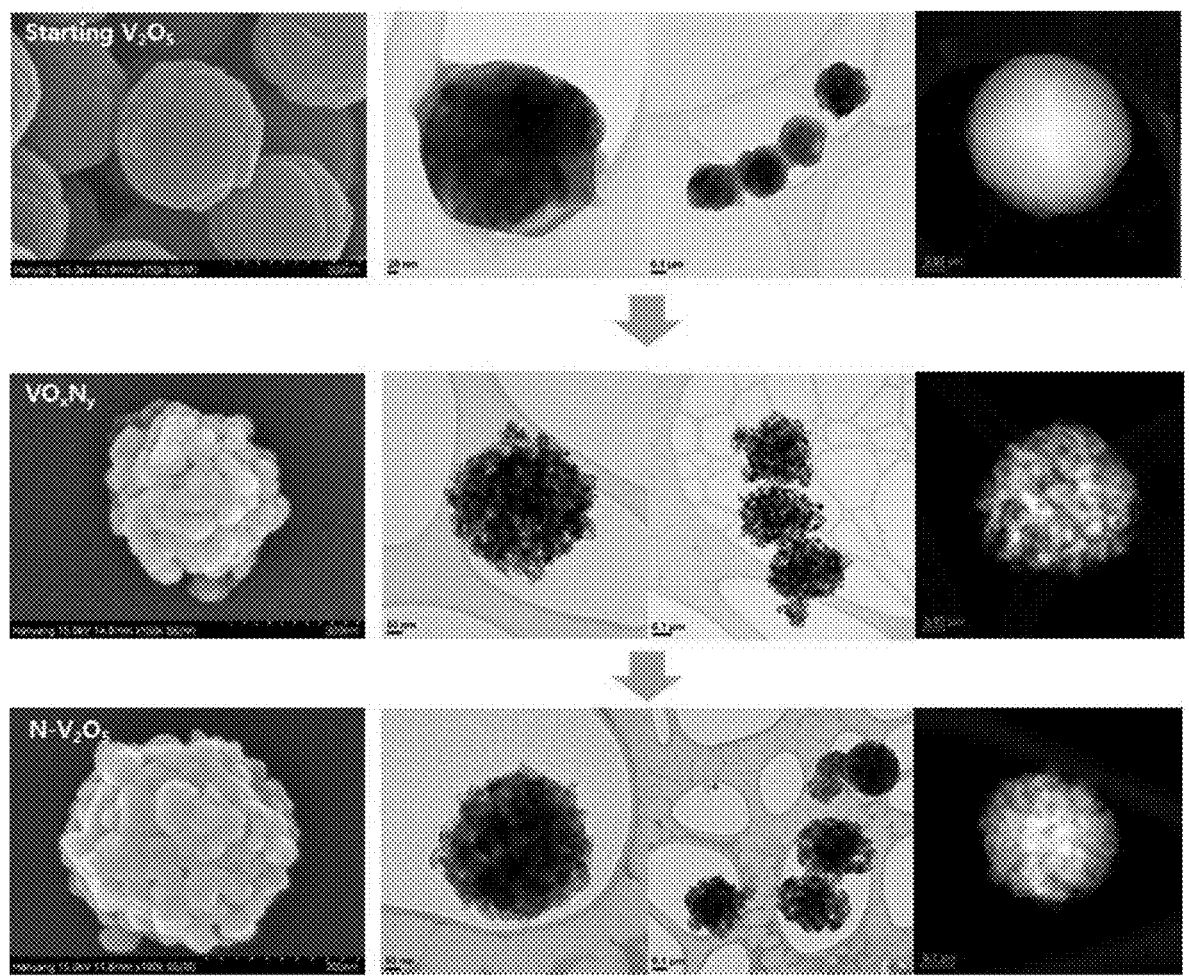

[Fig. 21]
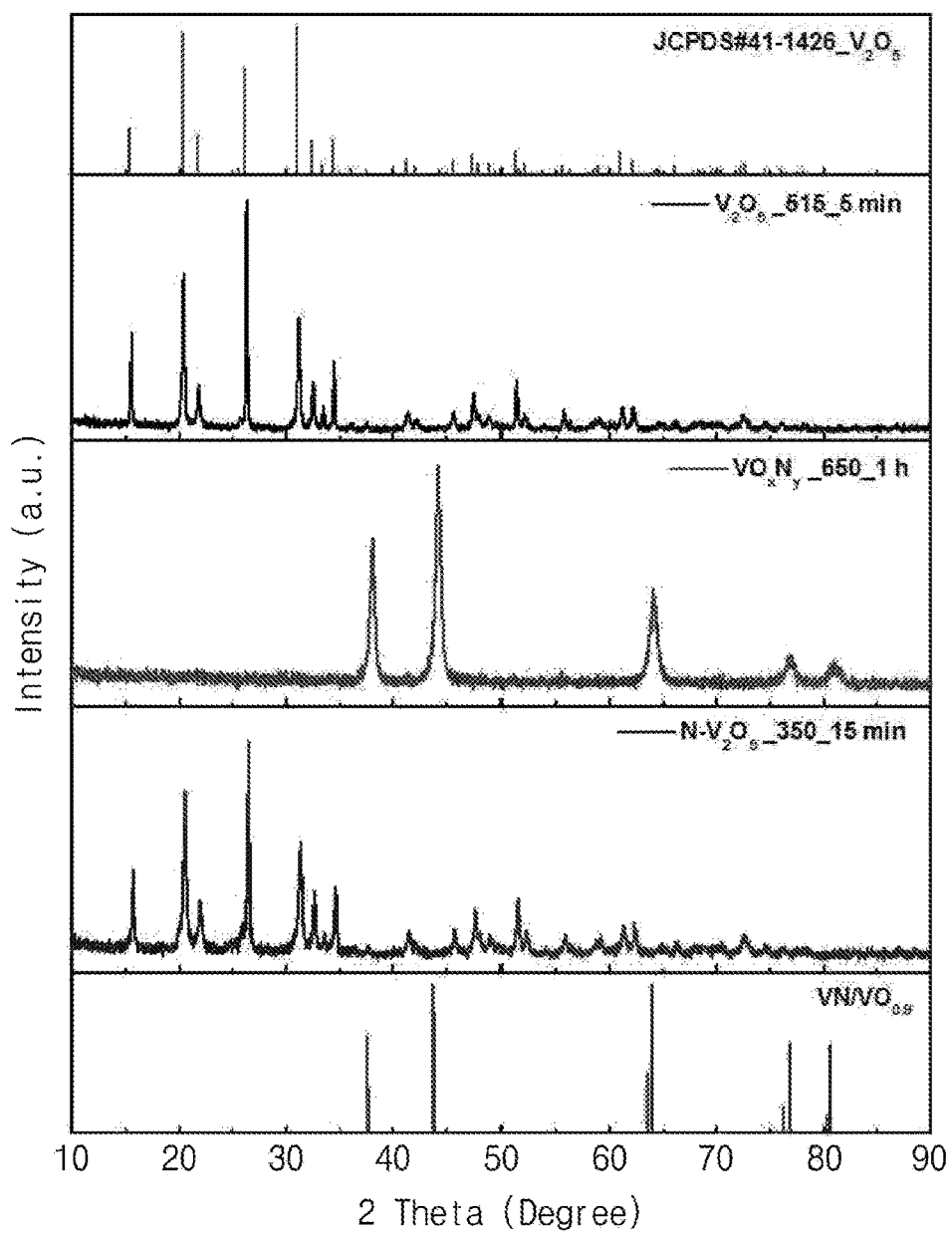

[Fig. 22]
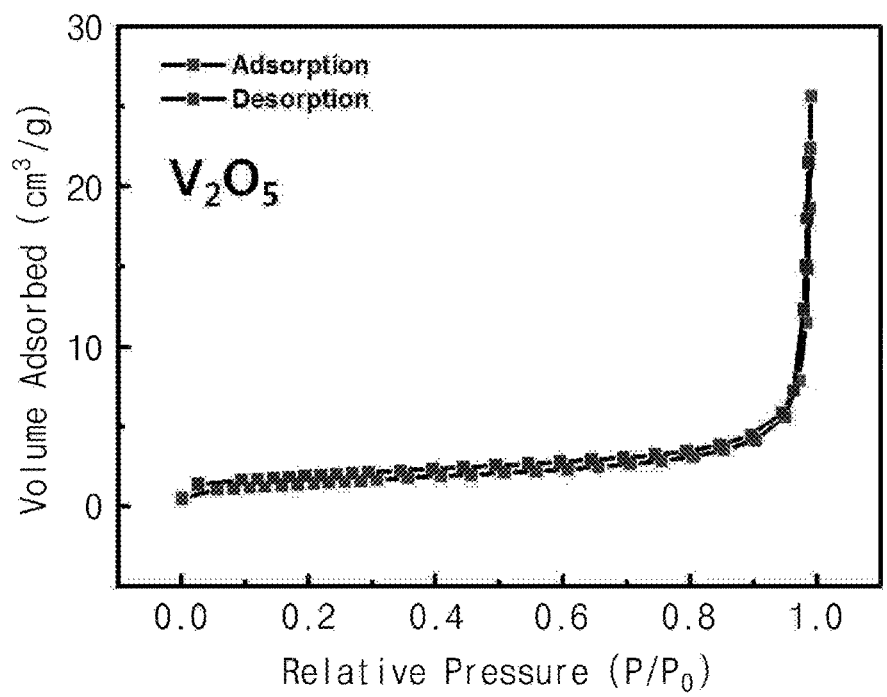

[Fig. 23]
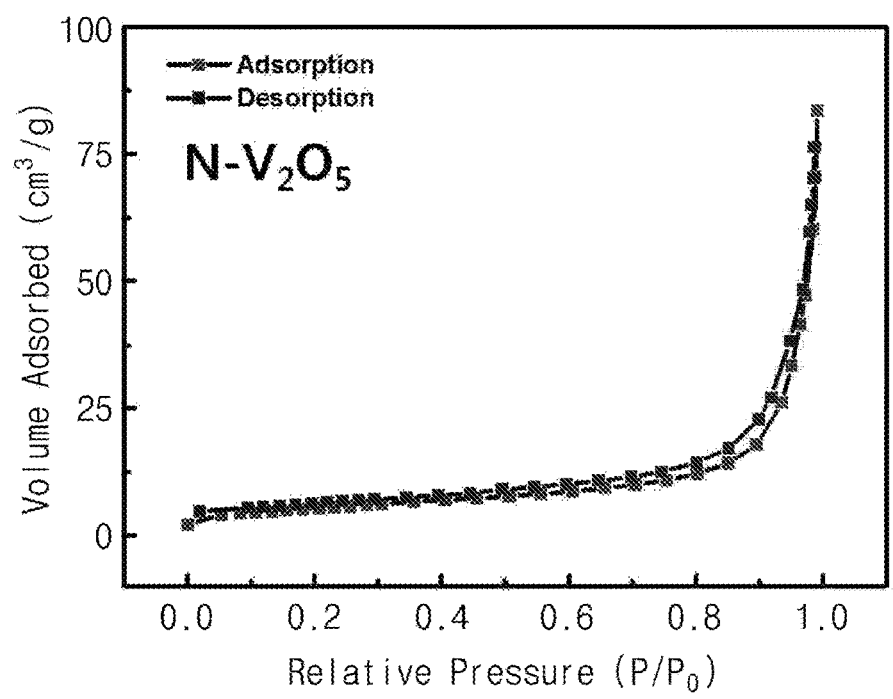

[Fig. 24]
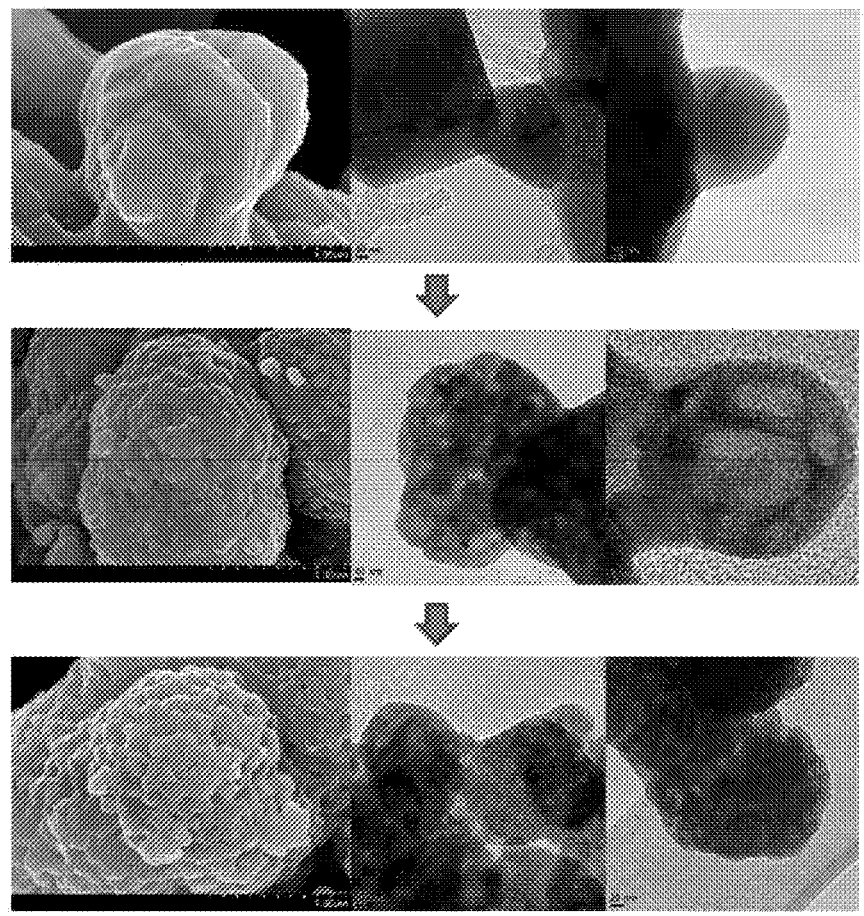

[Fig. 25]
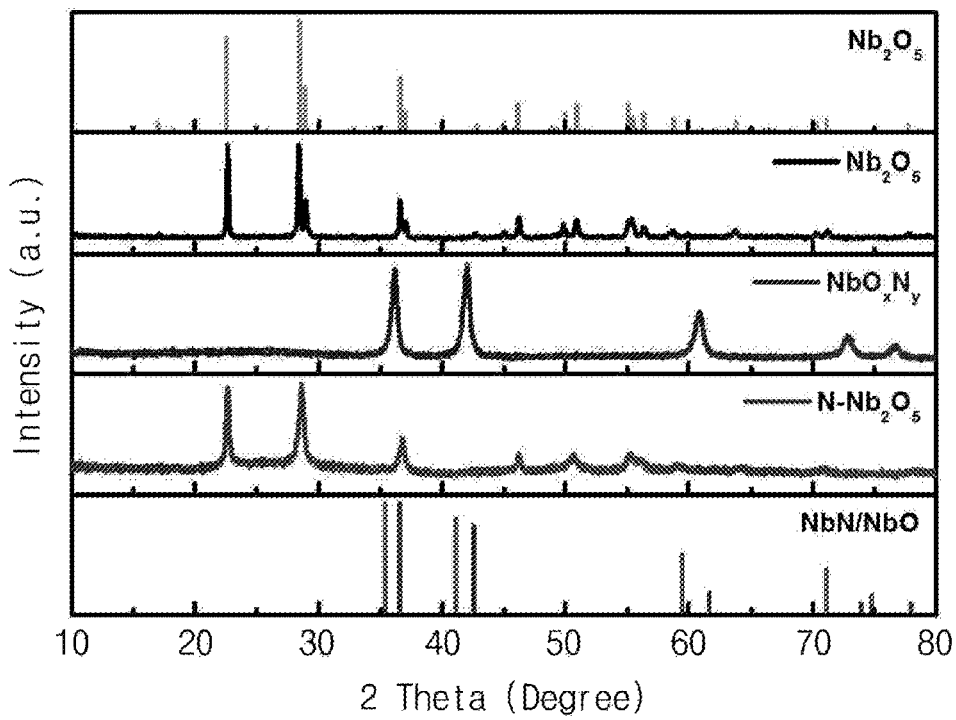
[Fig. 26]
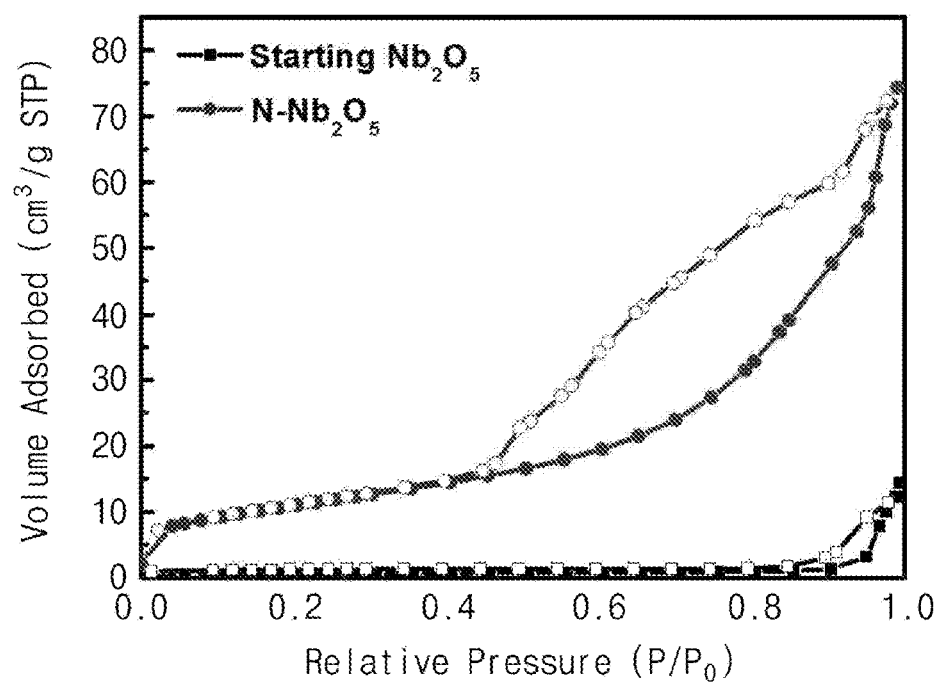

[Fig. 27]
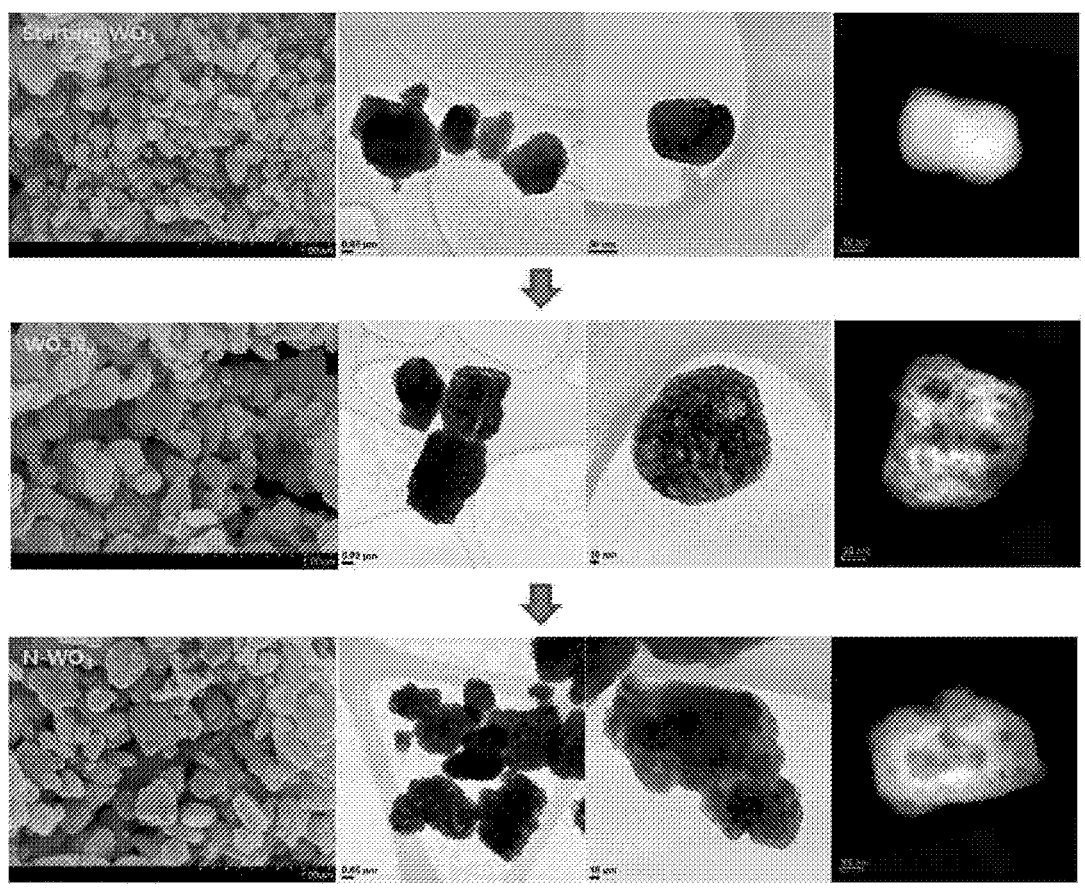

[Fig. 28]
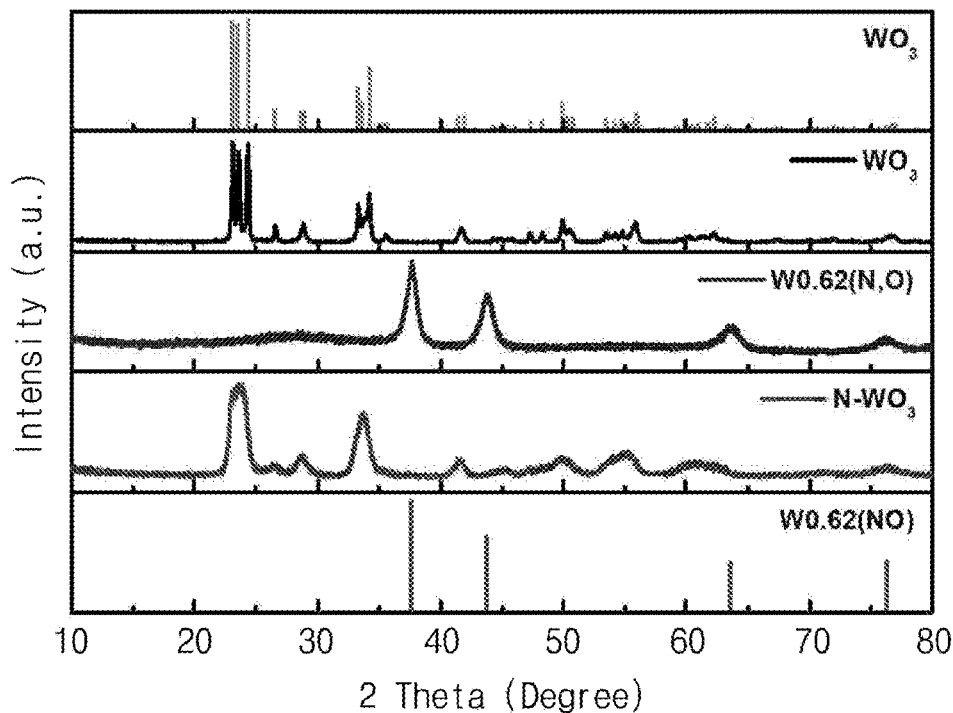
[Fig. 29]
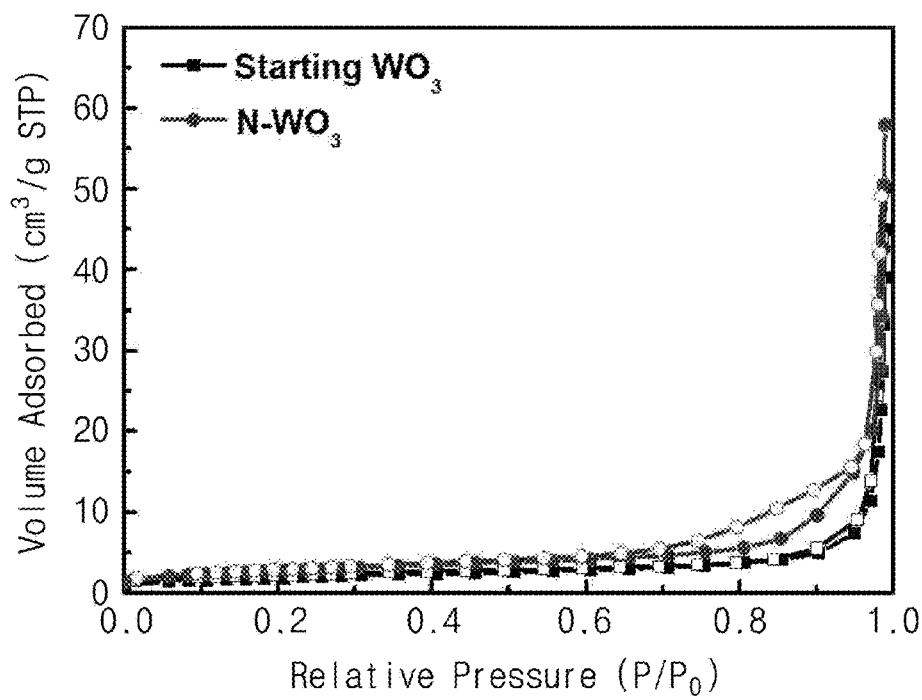

[Fig. 30]
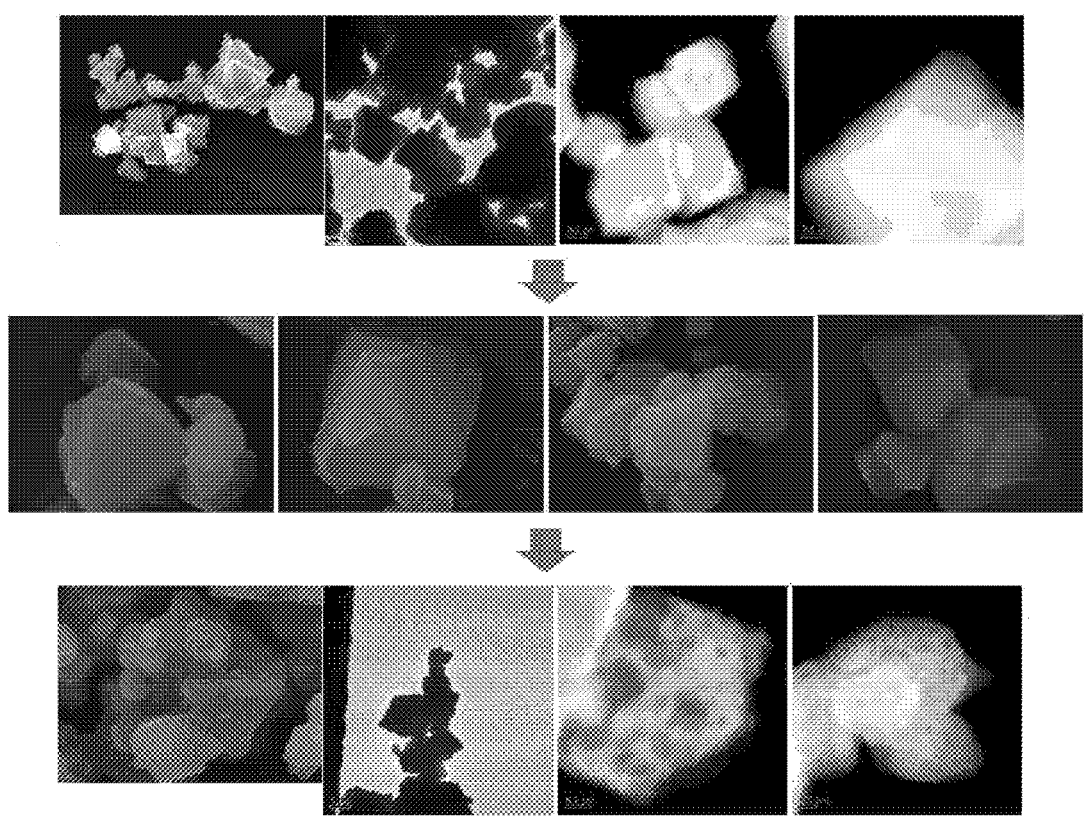

[Fig. 31]
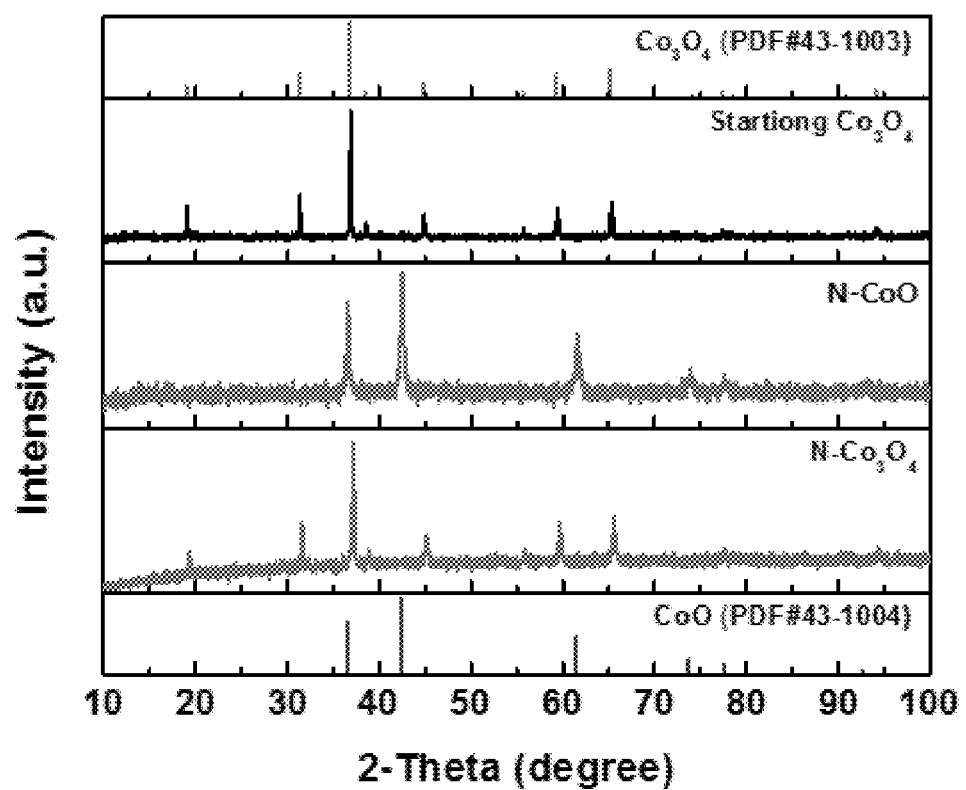

[Fig. 32]
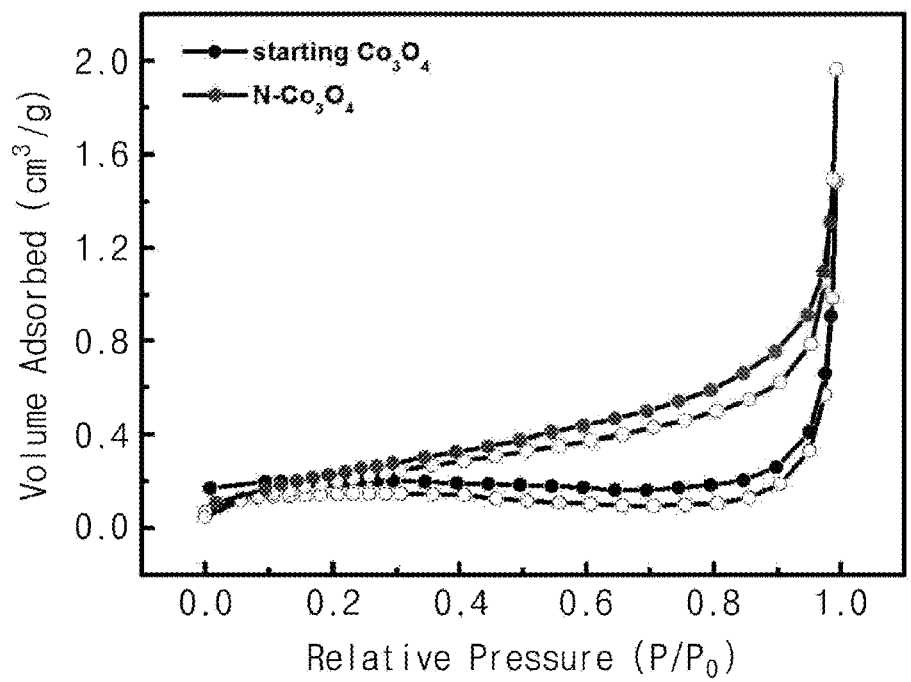

[Fig. 33]
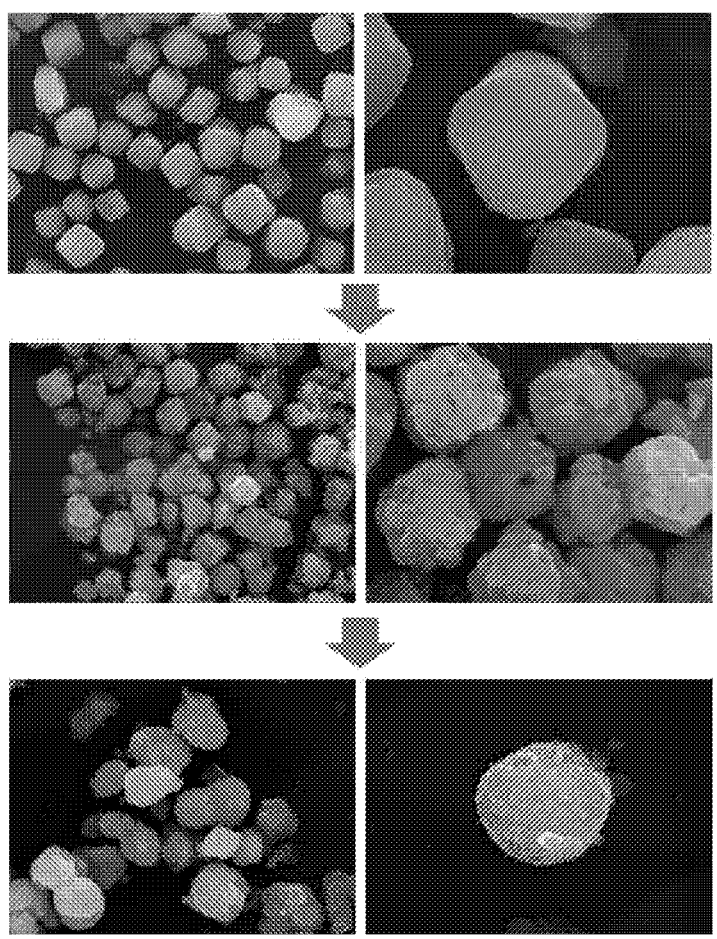

[Fig. 34]
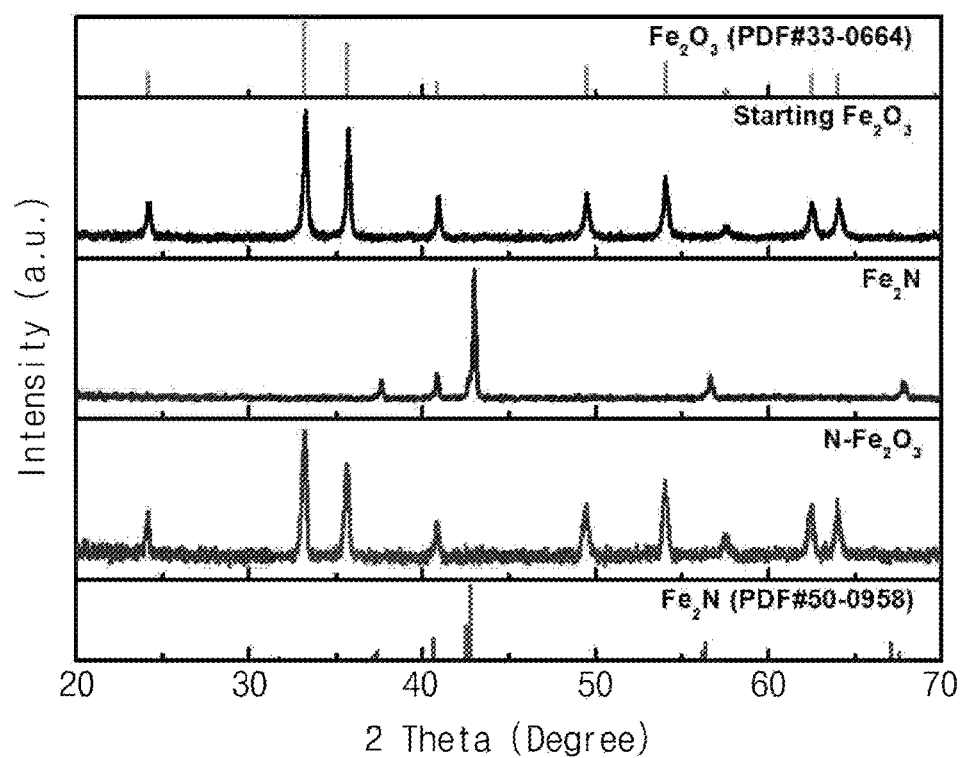

[Fig. 35]
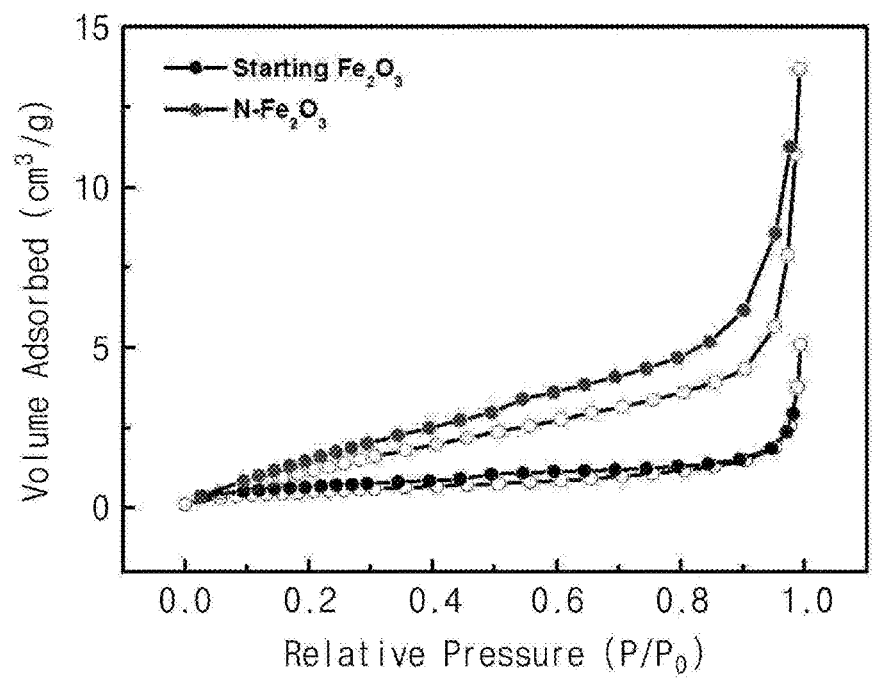

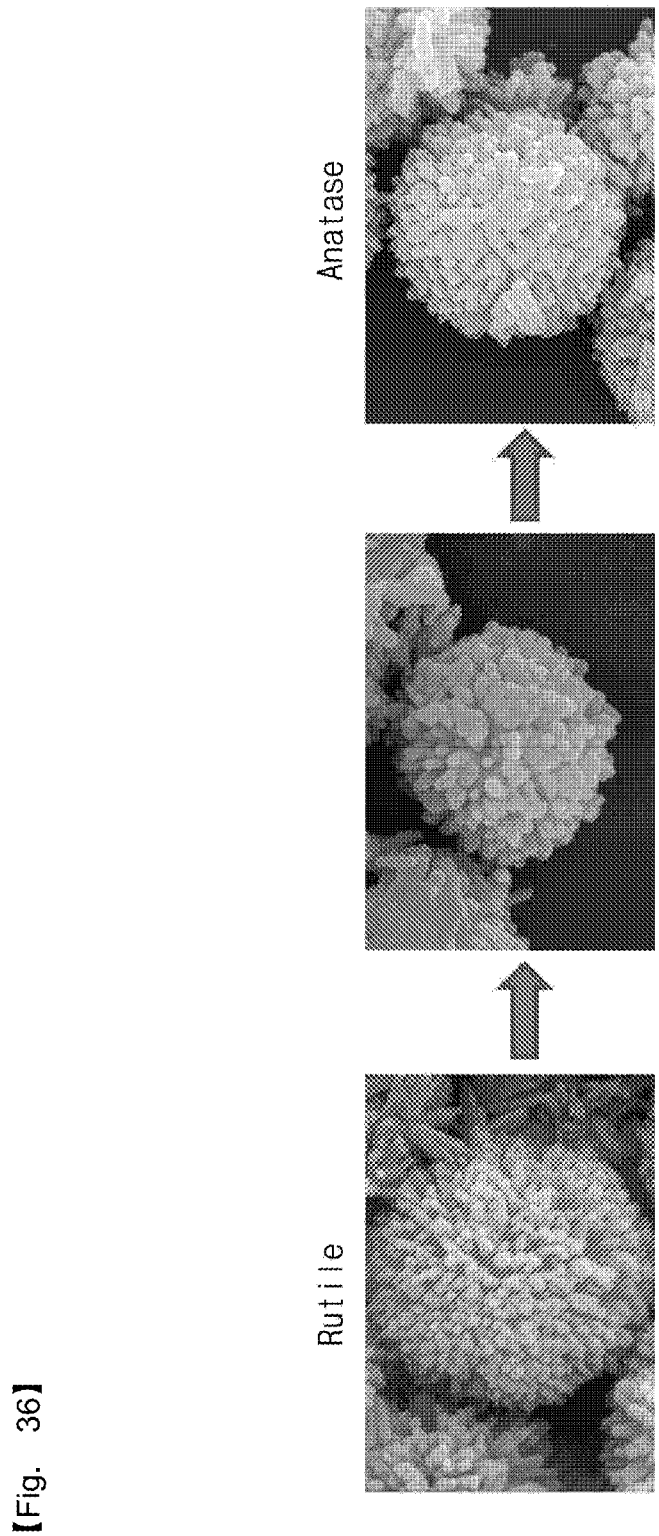
[Fig. 36]

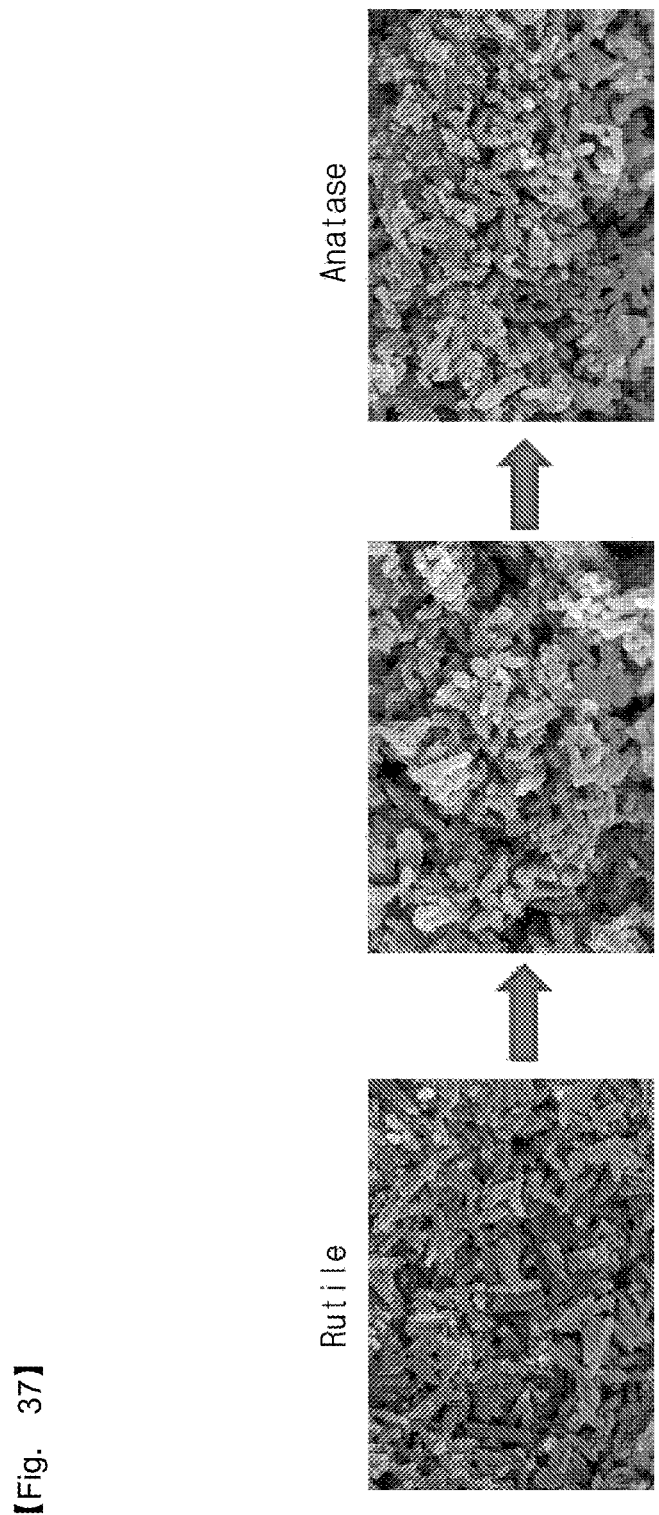
[Fig. 37]

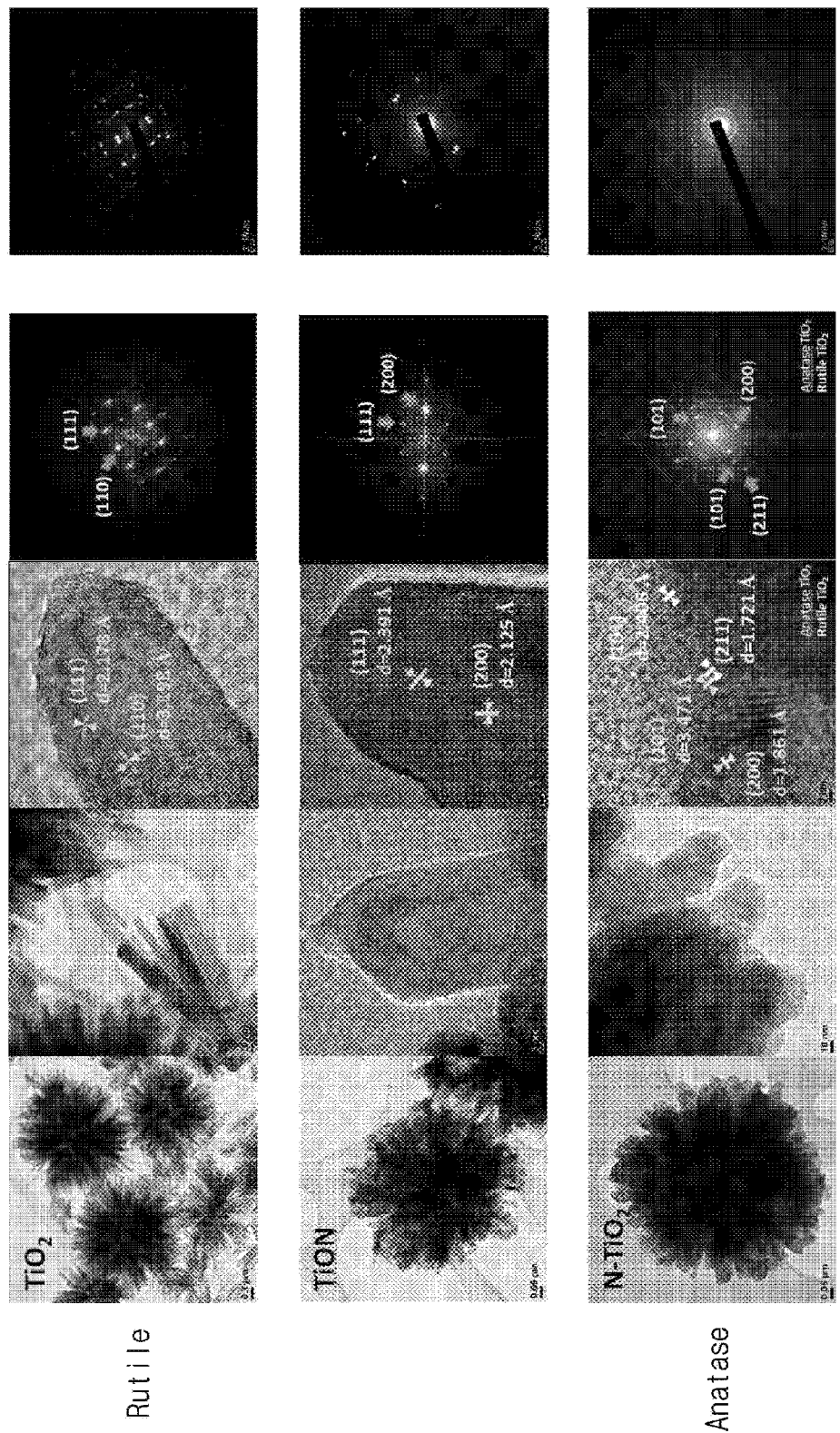
[Fig. 38]

[Fig. 39]
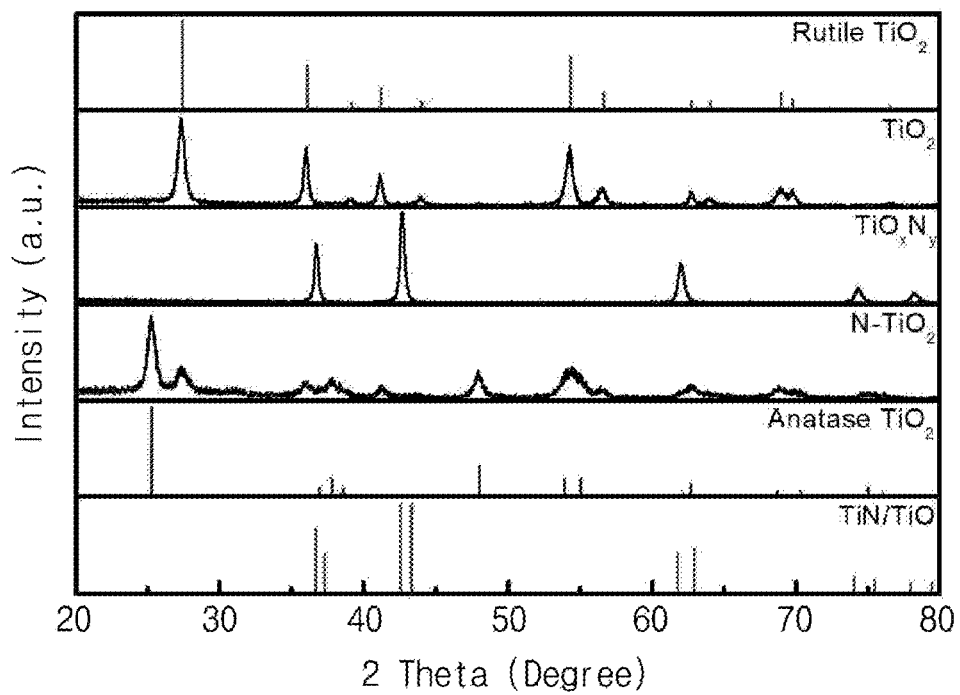

[Fig. 40]
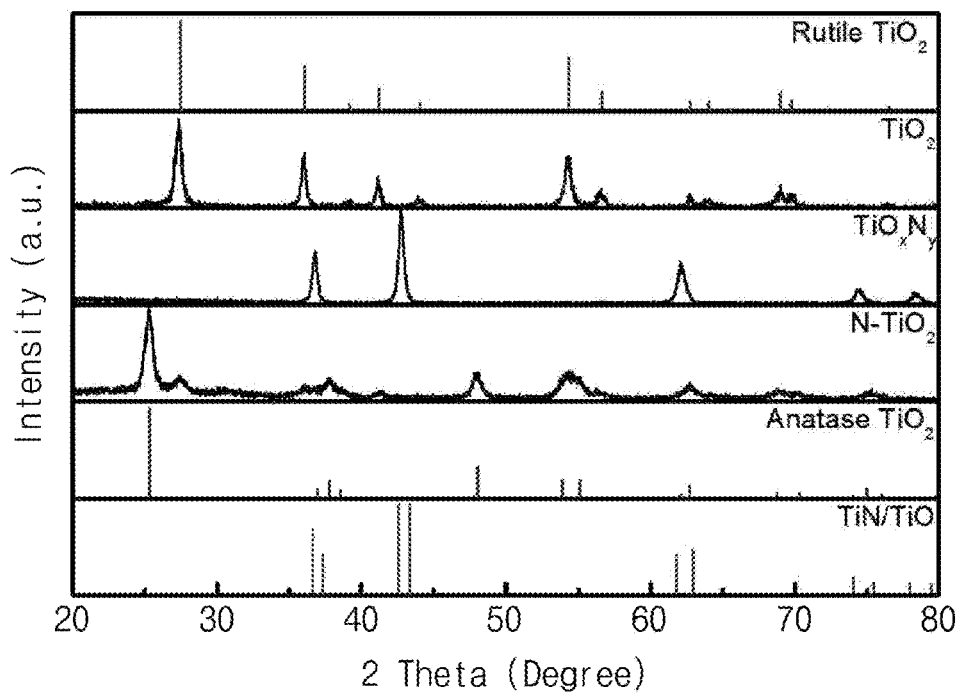

[Fig. 41]
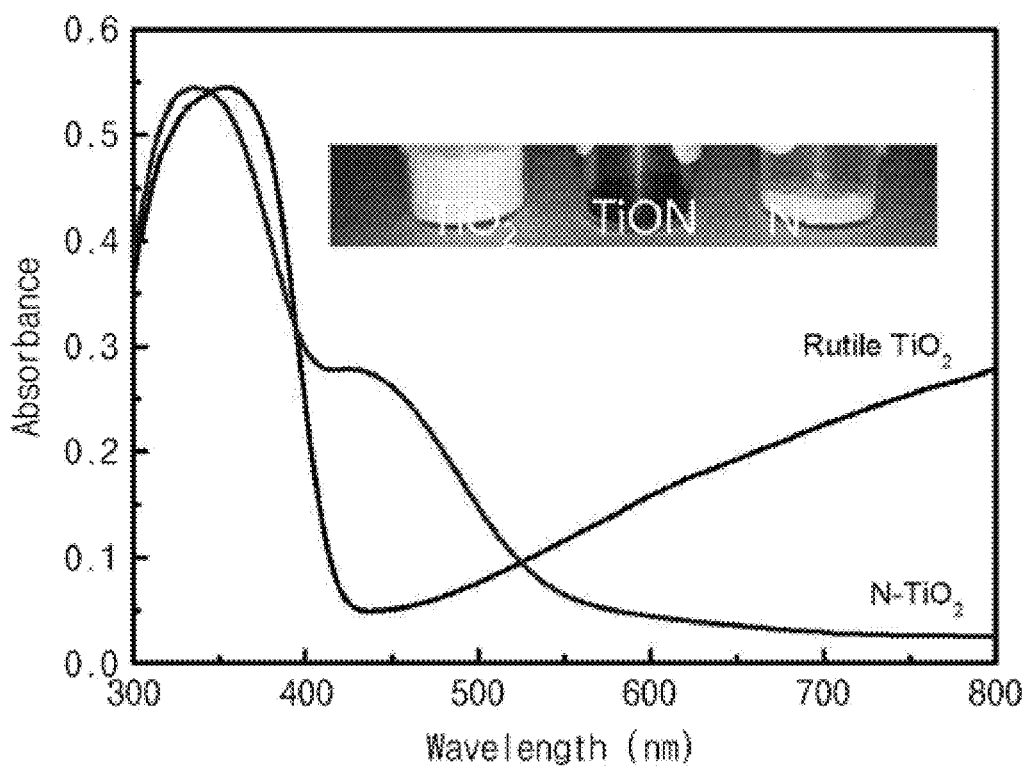

[Fig. 42]
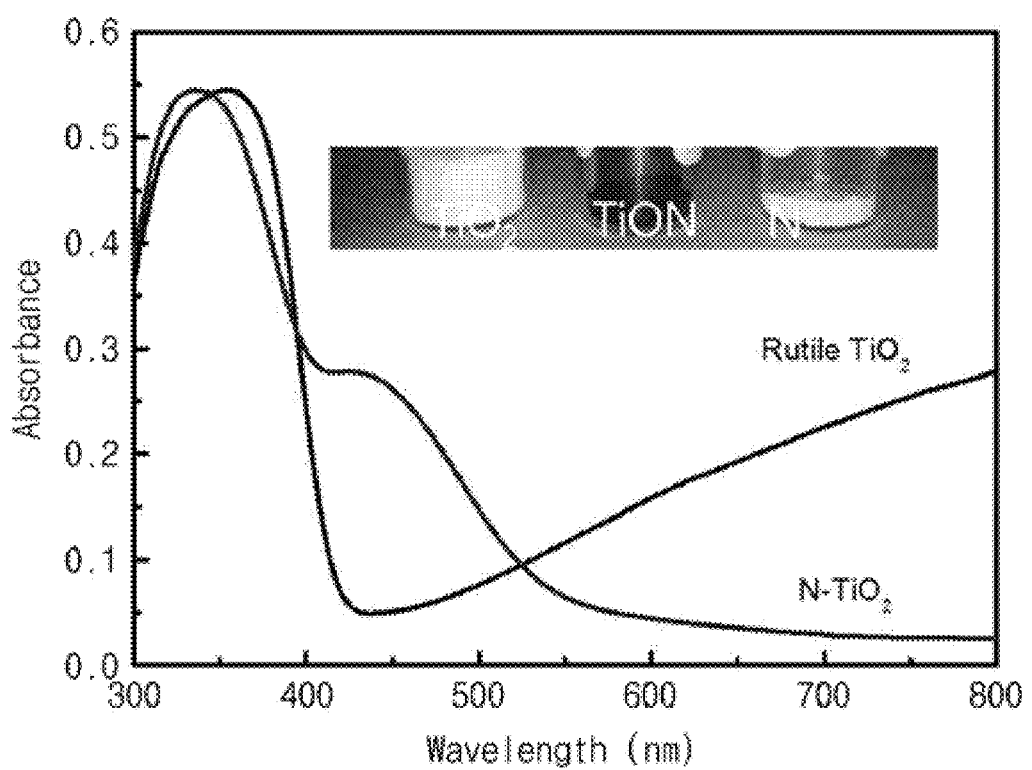

[Fig. 43]
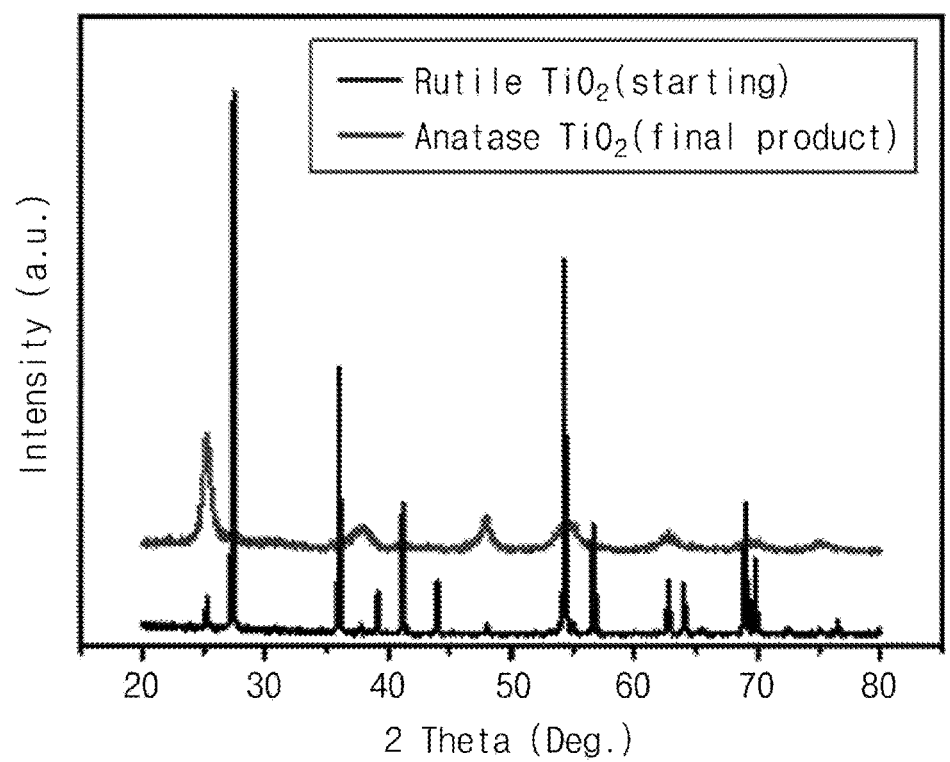

【Fig. 44】
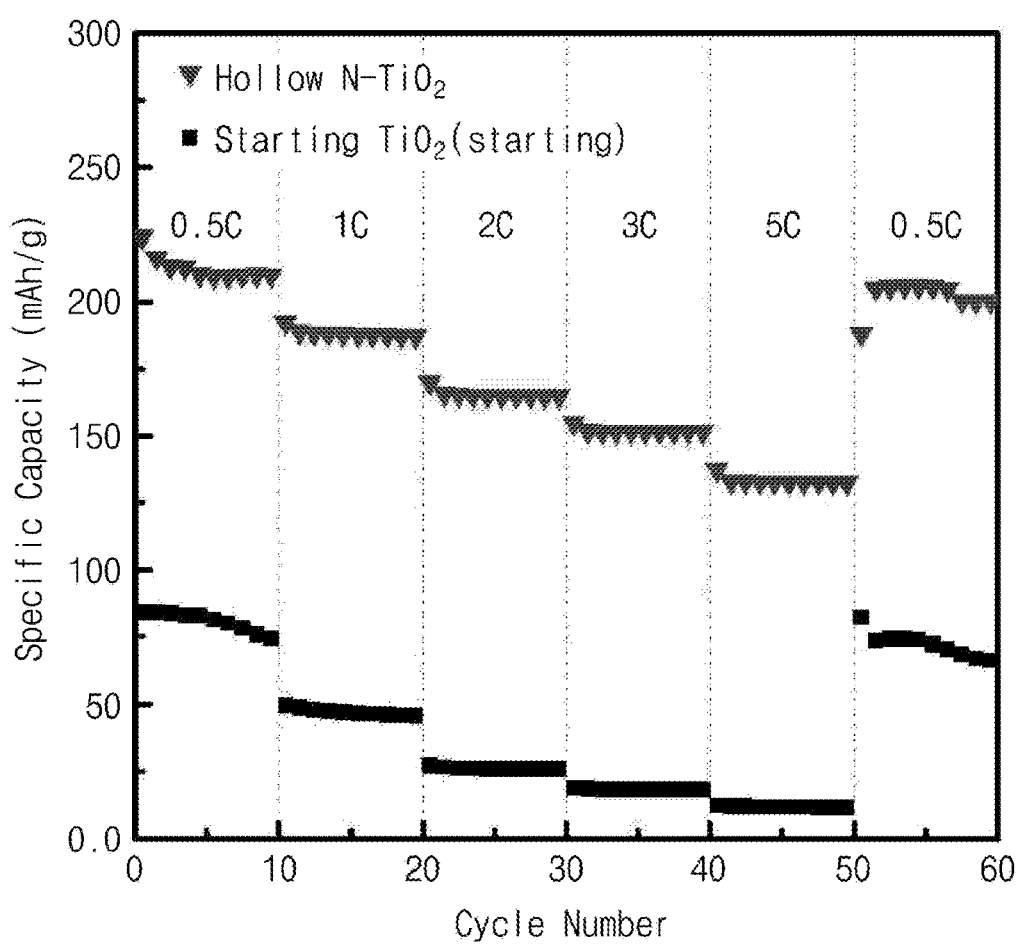

[Fig. 45]
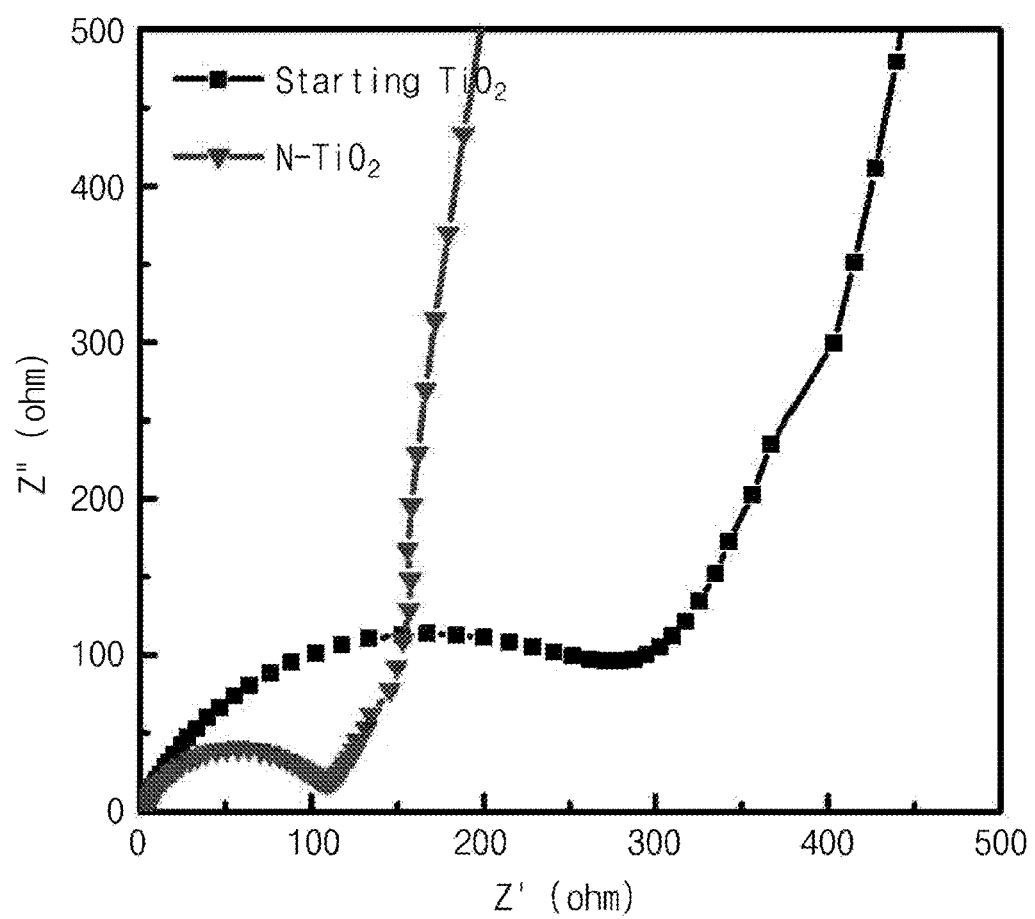

[Fig. 46]
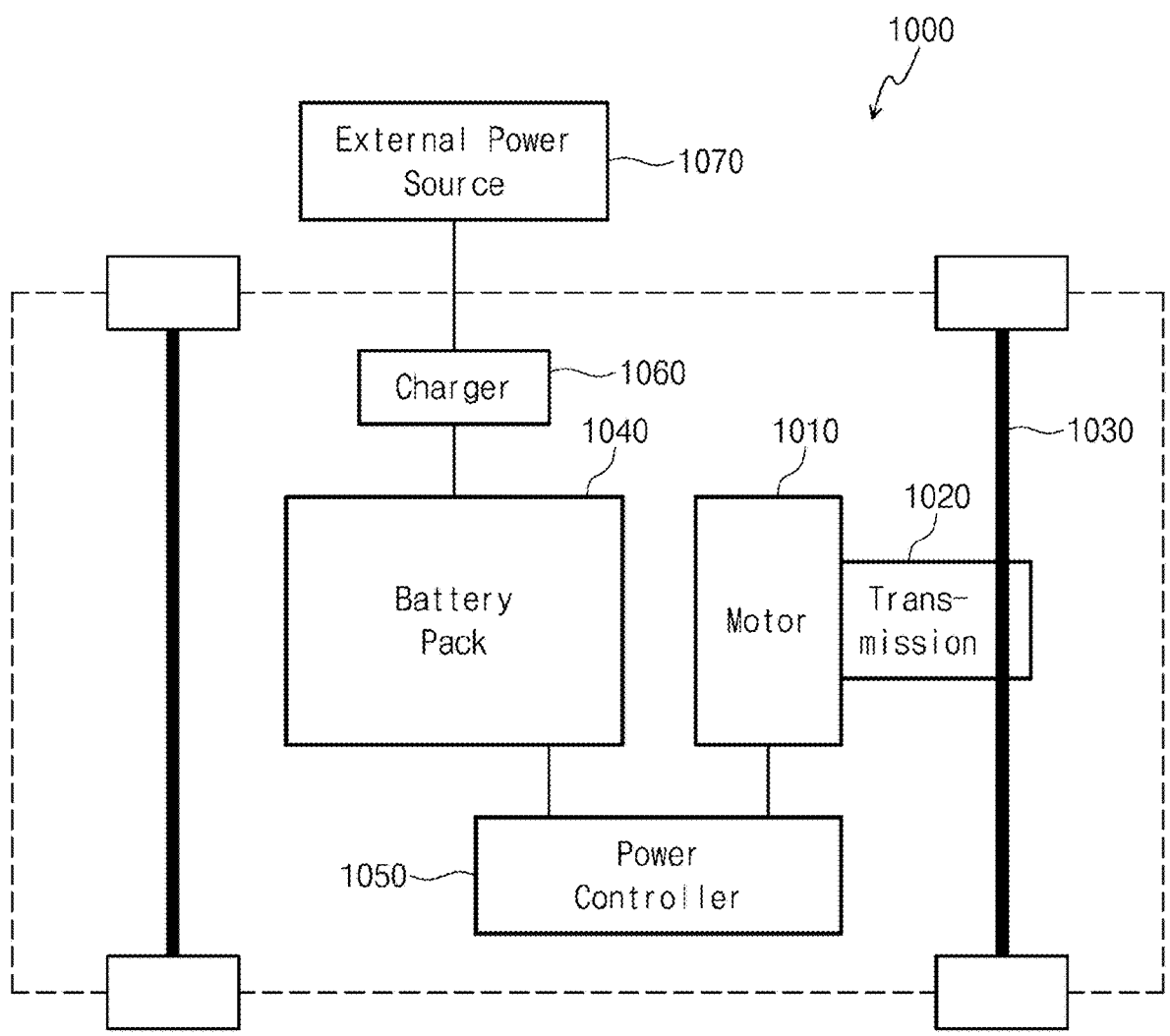

【Fig. 47】
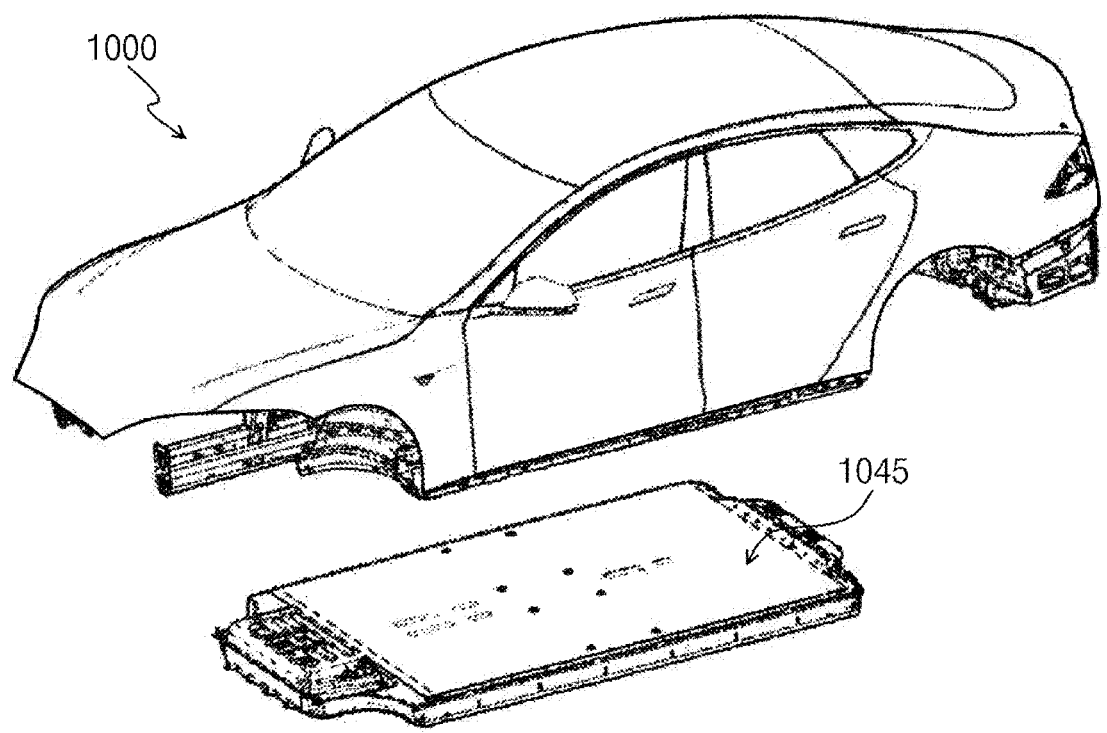

[Fig. 48]
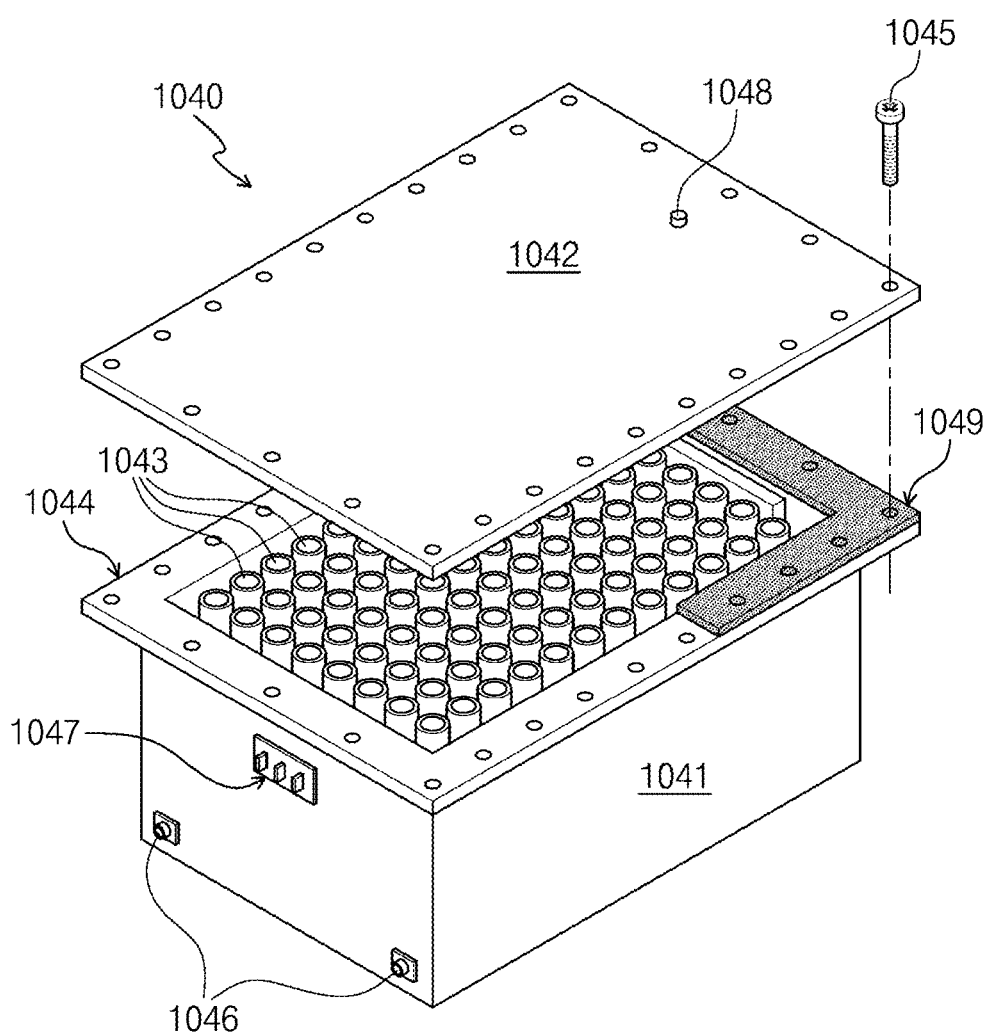

ANNEALING METHOD AND NITROGEN-DOPED METAL OXIDE STRUCTURE

CROSS-REFERENCE TO RELATED APPLICATION

This application is a continuation of pending International Application No. PCT/KR2017/005699, which was filed on May 31, 2017 and claims priority to Korean Patent Application Nos. 10-2016-0067804, 10-2016-0067798 and 10-2017-0063896, filed on May 31, 2016, May 31, 2016 and May 24, 2017, in the Korean Intellectual Property Office, the disclosures of which are hereby incorporated by reference in their entireties.

THE NAMES OF THE PARTIES TO A JOINT RESEARCH AGREEMENT

This invention was supported by Samsung Research Funding & Incubation Center of Samsung Electronics under Project Number SRFC-MA1601-03

BACKGROUND

1. Field

The present disclosure relates to an annealing method and a nitrogen-doped metal oxide structure, and more particularly, to an annealing method including performing annealing processes in a gas atmosphere including nitrogen and a gas atmosphere including oxygen, and a nitrogen-doped metal oxide structure fabricated using the same.

2. Description of the Related Art

Materials are applied to various fields such as cars, electric home appliances and construction and greatly affect quality, performance and prices of products. Various new materials are used in many fields in daily life, such as cosmetics, clothing, sports equipment, paint, packaging, and food. Applications of these new materials are expanded to high-tech fields such as information technology (IT), biotechnology (BT), and environmental technology (ET).

In particular, lithium secondary batteries capable of storing electric energy are increasingly demanded by the expensive spread of electric cars and energy storage systems (ESS) as well as various portable electronic devices (e.g., smart phones, MP3 players, tablet PC, and notebook computers).

SUMMARY

The present disclosure may provide a nitrogen-doped metal oxide structure with high reliability and an annealing method of fabricating the same.

The present disclosure may also provide a porous nitrogen-doped metal oxide structure and an annealing method of fabricating the same.

The present disclosure may further provide a nitrogen-doped metal oxide structure with a great specific surface area and an annealing method of fabricating the same.

The present disclosure may further provide negative and positive active materials for a lithium secondary battery, which includes a nitrogen-doped metal oxide structure.

The present disclosure may further provide negative and positive active materials for a lithium secondary battery having an increased capacity.

In an aspect, an annealing method may include preparing a metal oxide structure, annealing the metal oxide structure in a gas atmosphere including nitrogen to fabricate a metal compound structure, an oxygen content of which is lower than that of the metal oxide structure, from the metal oxide structure, and annealing the metal compound structure in a gas atmosphere including oxygen to fabricate a nitrogen-doped metal oxide structure, which has a specific surface area greater than that of the metal oxide structure, from the metal compound structure.

In an embodiment, a grain size of the nitrogen-doped metal oxide structure may be less than a grain size of the metal oxide structure.

In an embodiment, a grain size of the metal compound structure may be less than the grain size of the metal oxide structure, and a specific surface area of the metal compound structure may be greater than the specific surface area of the metal oxide structure.

In an embodiment, the grain size of the nitrogen-doped metal oxide structure may be less than the grain size of the metal compound structure, and the specific surface area of the nitrogen-doped metal oxide structure may be less than the specific surface area of the metal compound structure.

In an embodiment, the metal oxide structure may be a bulk type, and the nitrogen-doped metal oxide structure may be a porous structure.

In an embodiment, the metal oxide structure may include titanium oxide having a rutile phase, and the metal compound structure and the nitrogen-doped metal oxide structure may include an anatase phase.

In an embodiment, the metal oxide structure may include a plurality of transition metal elements.

In an embodiment, the metal oxide structure may be annealed for a first time, and the metal compound structure may be annealed for a second time shorter than the first time.

In an embodiment, the metal oxide structure may be annealed at a first temperature, and the metal compound structure may be annealed at a second temperature lower than the first temperature.

In an embodiment, the metal oxide structure may include iron (Fe), and the metal compound structure may be a metal nitride structure. A grain size of the metal nitride structure may be greater than a grain size of the metal oxide structure, and a grain size of the nitrogen-doped metal oxide structure may be less than the grain size of the metal oxide structure.

In an embodiment, the metal oxide structure may include niobium (Nb), a specific surface area of the metal compound structure may be greater than the specific surface area of the metal oxide structure, and the specific surface area of the nitrogen-doped metal oxide structure may be greater than the specific surface area of the metal compound structure.

In an embodiment, the metal oxide structure may include niobium (Nb) or cobalt (Co), a grain size of the metal compound structure may be less than the grain size of the metal oxide structure, and a grain size of the nitrogen-doped metal oxide structure may be greater than the grain size of the metal compound structure.

In an embodiment, a difference between an annealing temperature of the metal oxide structure and an annealing temperature of the metal compound structure may be controlled depending on a Group of a metal element included in the metal oxide structure.

In an embodiment, when the metal element included in the metal oxide structure is included in a Group higher than a standard Group, the annealing temperature of the metal compound structure may be higher than the annealing temperature of the metal oxide structure.

In an embodiment, the metal oxide structure may include cobalt, and the metal compound structure may include cobalt monoxide.

In an aspect, a nitrogen-doped metal oxide may include a nitrogen-doped metal oxide structure. The nitrogen-doped metal oxide structure may have a porous structure, and the porous structure may be formed by a top-down method.

In an embodiment, the nitrogen-doped metal oxide structure may be thermodynamically metastable as compared with a compound of oxygen and a metal element included in the nitrogen-doped metal oxide structure.

In an aspect, a positive active material for a lithium secondary battery may include the nitrogen-doped metal oxide according to the above embodiments.

BRIEF DESCRIPTION OF THE DRAWINGS

FIG. 1 is a flowchart illustrating an annealing method according to some embodiments of the inventive concepts.

FIG. 2 is a view illustrating a nitrogen-doped metal oxide structure fabricated by an annealing method according to some embodiments of the inventive concepts.

FIG. 3 is a view illustrating a process of fabricating nitrogen-doped titanium oxide according to an embodiment 1 of the inventive concepts.

FIG. 4 shows TEM images and ED patterns of titanium oxynitride according to the embodiment 1 of the inventive concepts.

FIG. 5 is a XRD graph of titanium oxynitride according to the embodiment 1 of the inventive concepts.

FIG. 6 is a view illustrating a change in crystal structure of titanium oxynitride according to the embodiment 1 of the inventive concepts.

FIG. 7 is a graph showing a measured specific surface area of titanium oxynitride according to the embodiment 1 of the inventive concepts.

FIG. 8 shows TEM images and ED patterns of nitrogen-doped titanium oxide according to the embodiment 1 of the inventive concepts.

FIG. 9 is a XRD graph of nitrogen-doped titanium oxide according to the embodiment 1 of the inventive concepts.

FIG. 10 is a view illustrating a change in crystal structure of nitrogen-doped titanium oxide according to the embodiment 1 of the inventive concepts.

FIG. 11 is a graph showing a measured specific surface area of nitrogen-doped titanium oxide according to the embodiment 1 of the inventive concepts.

FIG. 12 shows SEM images and TEM images of titanium oxide, titanium oxynitride, and nitrogen-doped titanium oxide according to the embodiment 1 of the inventive concepts.

FIG. 13 shows XRD data of titanium oxide, titanium oxynitride, and nitrogen-doped titanium oxide according to the embodiment 1 of the inventive concepts.

FIG. 14 shows SEM images and TEM images of molybdenum oxide, molybdenum oxynitride, and nitrogen-doped molybdenum oxide according to an embodiment 2 of the inventive concepts.

FIG. 15 shows XRD data of molybdenum oxide, molybdenum oxynitride, and nitrogen-doped molybdenum oxide according to the embodiment 2 of the inventive concepts.

FIG. 16 is a graph showing measured specific surface areas of molybdenum oxide and nitrogen-doped molybdenum oxide according to the embodiment 2 of the inventive concepts.

FIG. 17 shows SEM images and TEM images of tantalum oxide, tantalum nitride, and nitrogen-doped tantalum oxide according to an embodiment 3 of the inventive concepts.

FIG. 18 shows XRD data of tantalum oxide, tantalum nitride, and nitrogen-doped tantalum oxide according to the embodiment 3 of the inventive concepts.

FIG. 19 is a graph showing measured specific surface areas of tantalum oxide and nitrogen-doped tantalum oxide according to the embodiment 3 of the inventive concepts.

FIG. 20 shows SEM images and TEM images of vanadium oxide, vanadium oxynitride, and nitrogen-doped vanadium oxide according to an embodiment 4 of the inventive concepts.

FIG. 21 shows XRD data of vanadium oxide, vanadium oxynitride, and nitrogen-doped vanadium oxide according to the embodiment 4 of the inventive concepts.

FIG. 22 is a graph showing a measured specific surface area of vanadium oxide according to the embodiment 4 of the inventive concepts.

FIG. 23 is a graph showing a measured specific surface area of nitrogen-doped vanadium oxide according to the embodiment 4 of the inventive concepts.

FIG. 24 shows SEM images and TEM images of niobium oxide, niobium oxynitride, and nitrogen-doped niobium oxide according to an embodiment 5 of the inventive concepts.

FIG. 25 shows XRD data of niobium oxide, niobium oxynitride, and nitrogen-doped niobium oxide according to the embodiment 5 of the inventive concepts.

FIG. 26 is a graph showing measured specific surface areas of niobium oxide and nitrogen-doped niobium oxide according to the embodiment 5 of the inventive concepts.

FIG. 27 shows SEM images and TEM images of tungsten oxide, tungsten oxynitride, and nitrogen-doped tungsten oxide according to an embodiment 6 of the inventive concepts.

FIG. 28 shows XRD data of tungsten oxide, tungsten oxynitride, and nitrogen-doped tungsten oxide according to the embodiment 6 of the inventive concepts.

FIG. 29 is a graph showing measured specific surface areas of tungsten oxide and nitrogen-doped tungsten oxide according to the embodiment 6 of the inventive concepts.

FIG. 30 shows SEM images and TEM images of cobalt oxide, nitrogen-doped cobalt monoxide, and nitrogen-doped cobalt oxide according to an embodiment 7 of the inventive concepts.

FIG. 31 shows XRD data of cobalt oxide, nitrogen-doped cobalt monoxide, and nitrogen-doped cobalt oxide according to the embodiment 7 of the inventive concepts.

FIG. 32 is a graph showing measured specific surface areas of cobalt oxide and nitrogen-doped cobalt oxide according to the embodiment 7 of the inventive concepts.

FIG. 33 shows SEM images and TEM images of iron oxide, iron nitride, and nitrogen-doped iron oxide according to an embodiment 8 of the inventive concepts.

FIG. 34 shows XRD data of iron oxide, iron nitride, and nitrogen-doped iron oxide according to the embodiment 8 of the inventive concepts.

FIG. 35 is a graph showing measured specific surface areas of iron oxide and nitrogen-doped iron oxide according to the embodiment 8 of the inventive concepts.

FIGS. 36 and 37 show SEM images of titanium oxide, titanium oxynitride, and nitrogen-doped titanium oxide according to an embodiment 9 of the inventive concepts.

FIG. 38 shows TEM images and ED patterns of titanium oxide, titanium oxynitride, and nitrogen-doped titanium oxide according to the embodiment 9 of the inventive concepts.

FIGS. 39 and 40 are XRD graphs of titanium oxide, titanium oxynitride, and nitrogen-doped titanium oxide according to the embodiment 9 of the inventive concepts.

FIGS. 41 and 42 are graphs showing absorbances according to a wavelength of titanium oxide and nitrogen-doped titanium oxide according to the embodiment 9 of the inventive concepts.

FIG. 43 is a XRD graph showing a difference in crystallinity between titanium oxide and nitrogen-doped titanium oxide according to the embodiment 9 of the inventive concepts.

FIG. 44 is a graph showing capacity characteristics of lithium secondary batteries including titanium oxide and nitrogen-doped titanium oxide according to the embodiment 1 of the inventive concepts.

FIG. 45 is a graph showing impedances of electrodes including titanium oxide and nitrogen-doped titanium oxide according to the embodiment 1 of the inventive concepts.

FIG. 46 is a schematic block diagram illustrating an electric car according to some embodiments of the inventive concepts.

FIG. 47 is a perspective view illustrating an electric car according to some embodiments of the inventive concepts.

FIG. 48 is a perspective view illustrating a battery pack according to some embodiments of the inventive concepts.

DETAILED DESCRIPTION OF THE EMBODIMENTS

The inventive concepts will now be described more fully hereinafter with reference to the accompanying drawings, in which exemplary embodiments of the inventive concepts are shown. It should be noted, however, that the inventive concepts are not limited to the following exemplary embodiments, and may be implemented in various forms. Accordingly, the exemplary embodiments are provided only to disclose the inventive concepts and let those skilled in the art know the category of the inventive concepts.

It will be understood that when an element such as a layer, region or substrate is referred to as being "on" another element, it can be directly on the other element or intervening elements may be present. In addition, in the drawings, the thicknesses of layers and regions are exaggerated for clarity.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concepts explained and illustrated herein include their complementary counterparts. As used herein, the term "and/or" includes any and all combinations of one or more of the associated listed items.

The terminology used herein is for the purpose of describing particular embodiments only and is not intended to limit the invention. As used herein, the singular terms "a", "an" and "the" are intended to include the plural forms as well, unless the context clearly indicates otherwise. It will be further understood that the terms "comprises", "comprising", "includes", "including", "have", "has" and/or "having" when used herein, specify the presence of stated features, integers, steps, operations, elements, and/or components, but do not preclude the presence or addition of one or more other features, integers, steps, operations, elements, components, and/or groups thereof. Furthermore, it will be understood that when an element is referred to as being "connected" or "coupled" to another element, it may be directly connected or coupled to the other element or intervening elements may be present.

In addition, in explanation of the present invention, the descriptions to the elements and functions of related arts may be omitted if they obscure the subjects of the inventive concepts.

Furthermore, a metal oxynitride used herein may be a solid solution and may mean a compound in which a metal, oxygen and nitrogen are substantially uniformly mixed with each other. In addition, a nitrogen-doped metal oxide used herein may mean a compound which has the same crystal structure as a metal oxide before performing an annealing process according to some embodiments of the inventive concepts and in which a portion of oxygen included in a lattice is replaced with nitrogen or nitrogen is provided in an empty space in the lattice.

FIG. 1 is a flowchart illustrating an annealing method according to some embodiments of the inventive concepts, and FIG. 2 is a view illustrating a nitrogen-doped metal oxide structure fabricated by an annealing method according to some embodiments of the inventive concepts.

Referring to FIGS. 1 and 2, a metal oxide structure 110 may be prepared (S110). The metal oxide structure 110 may be an oxide including a transition metal. For example, the metal oxide structure 110 may include at least one of titanium oxide, molybdenum oxide, tantalum oxide, vanadium oxide, niobium oxide, tungsten oxide, cobalt oxide, or iron oxide. According to an embodiment, the metal oxide structure 110 may include a plurality of transition metal elements.

The metal oxide structure 110 may be a bulk type. In other words, substantially, the metal oxide structure 110 may hardly have a pore. Thus, as described later, a nitrogen-doped metal oxide structure fabricated from the metal oxide structure may have a porous structure and thus may have a wide specific surface area, as compared with the metal oxide structure.

The metal oxide structure 110 may be annealed in a gas atmosphere including nitrogen to fabricate a metal compound structure 120 from the metal oxide structure 110 (S120). For example, the gas including nitrogen may be an ammonia ($NH_3$) gas.

An oxygen content of the metal compound structure 120 may be lower than an oxygen content of the metal oxide structure 110. In an embodiment, the metal compound structure 120 may be a metal oxide (e.g., a metal monoxide) in which oxygen is partially removed from the metal oxide structure 110. In detail, when the metal oxide structure 110 is cobalt oxide, the metal compound structure 120 fabricated by annealing cobalt oxide in the nitrogen gas atmosphere may be cobalt monoxide (in more detail, nitrogen-doped cobalt monoxide). In another embodiment, the metal compound structure 120 may be a metal oxynitride in which a metal oxide formed by removing a portion of oxygen in the metal oxide structure 110 is combined with nitrogen. In still another embodiment, the metal compound structure 120 may be a metal nitride in which oxygen in the metal oxide structure 110 is completely replaced with nitrogen. In detail, when the metal oxide structure 110 is iron oxide or tantalum oxide, the metal compound structure 120 fabricated by annealing iron oxide or tantalum oxide in the nitrogen gas atmosphere may be iron nitride or tantalum nitride.

The metal oxide structure 110 may be annealed in the gas atmosphere including nitrogen without oxygen. Thus, nitrogen may be provided from the gas including nitrogen into the metal oxide structure 110 to fabricate the metal compound structure 120. For example, the metal oxide structure 110 may be annealed in the ammonia gas atmosphere at a temperature of 100 degrees Celsius to 1,000 degrees Celsius for a time of 1 minute to 5 hours.

According to an embodiment, a crystal structure of the metal compound structure 120 may be different from a crystal structure of the metal oxide structure 110.

According to an embodiment, in the process of annealing the metal oxide structure 110 in the gas atmosphere including nitrogen, a plurality of pores may be formed in the metal oxide structure 110 and a grain size of the metal oxide structure 110 may be reduced. Thus, a grain size of the metal compound structure 120 may be less than a grain size of the metal oxide structure 110. In other words, the metal compound structure 120 may have a more polycrystalline structure than the metal oxide structure 110. In addition, due to the plurality of pores, a specific surface area of the metal compound structure 120 may be greater than a specific surface area of the metal oxide structure 110.

On the contrary, when the metal oxide structure 110 is iron oxide, a grain size of the metal compound structure 120 may be greater than a grain size of the metal oxide structure 110.

The metal compound structure 120 may be annealed in a gas atmosphere including oxygen to fabricate a nitrogen-doped metal oxide structure 130, which has a specific surface area greater than that of the metal oxide structure 110, from the metal compound structure 120 (S130). For example, the gas including oxygen may be an oxygen gas.

The metal compound structure 120 may be annealed in the gas atmosphere including oxygen, and thus oxygen may be provided from the gas including oxygen into the metal compound structure 120 to fabricate the nitrogen-doped metal oxide structure 130. For example, the metal compound structure 120 may be annealed in the oxygen gas atmosphere at a temperature of 100 degrees Celsius to 1,000 degrees Celsius for a time of 1 minute to 5 hours.

In an embodiment, a crystal structure of the nitrogen-doped metal oxide structure 130 may be different from the crystal structure of the metal compound structure 120 and may be the same as the crystal structure of the metal oxide structure 110. In other words, a nitrogen content of the nitrogen-doped metal oxide structure 130 may be lower than a nitrogen content of the metal compound structure 120, the crystal structure of the nitrogen-doped metal oxide structure 130 may be changed into the same crystal structure as the metal oxide structure 110.

According to an embodiment, in a process of providing oxygen from the gas including oxygen into the metal compound structure 120, nitrogen in the metal compound structure 120 may be replaced with oxygen, and a grain size of the metal compound structure 120 may be reduced. Thus, a grain size of the nitrogen-doped metal oxide structure 130 may be less than the grain size of the metal oxide structure 110 before reaction (or annealing). In other words, the nitrogen-doped metal oxide structure 130 may have a more polycrystalline structure than the metal oxide structure 110 before reaction.

In an embodiment, a decrease in grain size in the process of converting the metal oxide structure 110 into the metal compound structure 120 may be greater than a decrease in grain size in the process of converting the metal compound structure 120 into the nitrogen-doped metal oxide structure 130. In other words, the grain size may be further reduced in the annealing process performed in the gas atmosphere including nitrogen.

Unlike the above descriptions, when the metal oxide structure 110 is niobium oxide or cobalt oxide, a grain size of the nitrogen-doped metal oxide structure 130 may be greater than a grain size of the metal compound structure 120. However, when the metal oxide structure 110 is niobium oxide, a decrease in grain size in the process of converting the metal oxide structure 110 into the metal compound structure 120 may be less than a decrease in grain size in the process of converting the metal compound structure 120 into the nitrogen-doped metal oxide structure 130, and thus a grain size of the nitrogen-doped metal oxide structure 130 may be greater than a grain size of the metal oxide structure 110. On the contrary, when the metal oxide structure 110 is cobalt oxide, a decrease in grain size in the process of converting the metal oxide structure 110 into the metal compound structure 120 may be greater than a decrease in grain size in the process of converting the metal compound structure 120 into the nitrogen-doped metal oxide structure 130, and thus a grain size of the nitrogen-doped metal oxide structure 130 may be less than a grain size of the metal oxide structure 110.

In addition, a specific surface area of the nitrogen-doped metal oxide structure 130 may be less than the specific surface area of the metal compound structure 120. However, an increase in specific surface area in the process of converting the metal oxide structure 110 into the metal compound structure 120 may be greater than a decrease in specific surface area in the process of converting the metal compound structure 120 into the nitrogen-doped metal oxide structure 130. Thus, the specific surface area of the nitrogen-doped metal oxide structure 130 may be less than the specific surface area of the metal compound structure 120 but may be greater than the specific surface area of the metal oxide structure 110.

On the other hand, when the metal oxide structure 110 is niobium oxide or iron oxide, a specific surface area of the nitrogen-doped metal oxide structure 130 may be greater than a specific surface area of the metal compound structure 120.

In addition, when the metal oxide structure 110 is rutile titanium oxide, the nitrogen-doped metal oxide structure 130 converted from the metal compound structure 120 may include an anatase phase. Thus, the nitrogen-doped metal oxide structure 130 may be thermodynamically metastable, as compared with the metal oxide structure 110.

According to an embodiment, a nitrogen concentration in the nitrogen-doped metal oxide structure 130 may be substantially constant. In other words, concentrations of oxygen and nitrogen may be substantially uniformly in an inner portion and an outer portion of the nitrogen-doped metal oxide structure 130.

Conditions of the process of annealing the metal oxide structure 110 in the gas atmosphere including nitrogen may be different from conditions of the process of annealing the metal compound structure 120 in the gas atmosphere including oxygen. In detail, when the metal oxide structure 110 is annealed at a first temperature for a first time, the metal compound structure 120 may be annealed at a second temperature lower than the first temperature for a second time shorter than the first time. As a result, pores of the nitrogen-doped metal oxide structure 130 may be substantially maintained, and thus the nitrogen-doped metal oxide structure 130 may have a great specific surface area.

On the other hand, according to an embodiment, a difference between a temperature annealing the metal oxide structure 110 and a temperature annealing the metal compound structure 120 may be controlled depending on a Group of the metal element included in the metal oxide structure 110. In other words, when the metal element included in the metal oxide structure 110 is included in a Group higher than a standard Group, a temperature annealing the metal compound structure 120 may be higher than a temperature annealing the metal oxide structure 110. For example, when the standard Group is a Group 9 and the metal oxide structure 110 is cobalt oxide, a temperature annealing cobalt monoxide (in detail, nitrogen-doped cobalt monoxide) may be higher than a temperature annealing cobalt oxide. Thus, cobalt monoxide (in detail, nitrogen-doped cobalt monoxide) may be easily converted into nitrogen-doped cobalt oxide (in detail, nitrogen-doped $Co_3O_4$).

According to the aforementioned embodiments of the inventive concepts, the metal oxide structure 110 may be annealed in the gas atmosphere including nitrogen to fabricate the metal compound structure 120, and the metal compound structure 120 may be annealed in the gas atmosphere including oxygen to fabricate the nitrogen-doped metal oxide structure 130 which has the specific surface area greater than that of the metal oxide structure 110 and the grains smaller than the grain of the metal oxide structure 110.

If a porous metal oxide structure is annealed in a gas atmosphere including nitrogen and then is annealed in a gas atmosphere including oxygen unlike the aforementioned embodiments of the inventive concepts, a nitrogen-doped metal oxide structure may have a specific surface area less than that of the porous metal oxide structure.

However, according to the aforementioned embodiments of the inventive concepts, the nitrogen-doped metal oxide structure 130 which has the great specific surface area of the porous structure and the small grain size may be fabricated from the bulk type metal oxide structure 110 by the simple and inexpensive annealing method performed while changing the gas atmosphere.

In addition, unlike a bottom-up method of fabricating a porous structure from a plurality of structures, the nitrogen-doped metal oxide structure 130 having the porous structure may be fabricated from the bulk type metal oxide structure 110 by a top-down method in the embodiments of the inventive concepts. Thus, a material having a porous nano structure may be easily and simply fabricated using various bulk materials used commercially.

Furthermore, the nitrogen-doped metal oxide structure 130 according to the embodiments of the inventive concepts may have improved electrical characteristics (e.g., electrical conductivity) and improved optical characteristics (e.g., absorbance), as compared with the metal oxide structure 110. In addition, when the nitrogen-doped metal oxide structure 130 is used as a positive active material of a lithium secondary battery, capacity and life span characteristics of the lithium secondary battery may be improved.

Evaluation results of characteristics of the nitrogen-doped metal oxide structures fabricated according to some embodiments of the inventive concepts will be described hereinafter.

Nitrogen-Doped Titanium Oxide Structure According to Embodiment 1

Bulk type titanium oxide having an anatase phase was prepared. An ammonia gas was provided to the titanium oxide at a rate of 0.5 L/min, and the titanium oxide was heated at a heating rate of 10° C./min and was annealed at 800° C. for 1 hour to fabricate titanium oxynitride from the titanium oxide.

The titanium oxynitride was annealed in the atmosphere at 450° C. for 20 minutes to fabricate nitrogen-doped titanium oxide from the titanium oxynitride.

FIG. 3 is a view illustrating a process of fabricating nitrogen-doped titanium oxide according to an embodiment 1 of the inventive concepts, and FIG. 4 shows TEM images and ED patterns of titanium oxynitride according to the embodiment 1 of the inventive concepts. FIG. 5 is a XRD graph of titanium oxynitride according to the embodiment 1 of the inventive concepts, and FIG. 6 is a view illustrating a change in crystal structure of titanium oxynitride according to the embodiment 1 of the inventive concepts. FIG. 7 is a graph showing a measured specific surface area of titanium oxynitride according to the embodiment 1 of the inventive concepts.

Referring to FIGS. 3 to 6, TEM images according to an annealing time of the titanium oxide according to the embodiment 1 were obtained to analyze ED patterns, XRD data according to the annealing time of the titanium oxide were analyzed, and specific surface areas according to the annealing time of the titanium oxide were measured as shown in the following table 1.

TABLE 1

| | Time (min) | | | |
| --- | --- | --- | --- | --- |
| | 0 | 15 | 25 | 30 |
| $a_s$, BET ($m^2 \, g^{-1}$) | 8.7042 | 18.545 | 25.234 | 29.541 |

As shown in FIGS. 4 to 6, since the titanium oxide is annealed in the ammonia gas atmosphere, titanium atoms in the titanium oxide migrate, and some of oxygen atoms in the titanium oxide are substituted or replaced with nitrogen atoms. Thus, the titanium oxynitride is fabricated from the titanium oxide having the anatase phase.

In addition, as shown in FIG. 7 and the table 1, as the annealing time of the titanium oxide in the ammonia gas atmosphere increases, the specific surface area increases.

FIG. 8 shows TEM images and ED patterns of nitrogen-doped titanium oxide according to the embodiment 1 of the inventive concepts, FIG. 9 is a XRD graph of nitrogen-doped titanium oxide according to the embodiment 1 of the inventive concepts, and FIG. 10 is a view illustrating a change in crystal structure of nitrogen-doped titanium oxide according to the embodiment 1 of the inventive concepts. FIG. 11 is a graph showing a measured specific surface area of nitrogen-doped titanium oxide according to the embodiment 1 of the inventive concepts.

Referring to FIGS. 8 to 11, TEM images according to an annealing time of the titanium oxynitride according to the embodiment 1 were obtained to analyze ED patterns, XRD data according to the annealing time of the titanium oxynitride were analyzed, and specific surface areas according to the annealing time of the titanium oxynitride were measured as shown in the following table 2.

TABLE 2

| | $a_s$, BET (m²/g) | Total pore volume (p/p0 = 0.990) |
|---|---|---|
| Starting TiO₂ | 8.70 | 0.0833 |
| TiO$_x$N$_y$ | 27.38 | 0.191 |
| N—TiO₂ | 23.25 | 0.179 |

As shown in FIGS. 8 to 10, since the titanium oxynitride is annealed in an oxygen gas atmosphere, nitrogen in the titanium oxynitride is substituted with oxygen and the nitrogen-doped titanium oxide having the anatase phase is fabricated.

In addition, as shown in FIG. 11 and the table 2, a specific surface area of the nitrogen-doped titanium oxide is somewhat less than that of the titanium oxynitride but is significantly greater than that of the titanium oxide.

FIG. 12 shows SEM images and TEM images of titanium oxide, titanium oxynitride, and nitrogen-doped titanium oxide according to the embodiment 1 of the inventive concepts, and FIG. 13 shows XRD data of titanium oxide, titanium oxynitride, and nitrogen-doped titanium oxide according to the embodiment 1 of the inventive concepts.

Referring to FIGS. 12 and 13, SEM images and TEM images of the titanium oxide, the titanium oxynitride and the nitrogen-doped titanium oxide according to the embodiment 1 were obtained as shown in FIG. 12, and XRD data thereof were analyzed as shown in FIG. 13.

In addition, grain sizes of the titanium oxide, the titanium oxynitride and the nitrogen-doped titanium oxide according to the embodiment 1 were measured as shown in the following table 3.

TABLE 3

| Classification | Grain size (Å) | Lattice parameter (a * b * c) |
|---|---|---|
| Starting TiO₂ | 567.83 | 3.783 * 3.783 * 9.508 |
| TiO$_x$N$_y$ | 292.24 | 4.192 * 4.192 * 4.192 |
| N—TiO₂ | 145.17 | 3.792 * 3.792 * 9.479 |

As shown in the table 3, the grain sizes of the titanium oxide, the titanium oxynitride and the nitrogen-doped titanium oxide decrease in the order named. In addition, a decrease in grain size in the process of annealing the titanium oxide in the ammonia gas atmosphere is greater than a decrease in grain size in the process of annealing the titanium oxynitride in the oxygen gas atmosphere.

Nitrogen-Doped Molybdenum Oxide Structure According to Embodiment 2

Bulk type molybdenum oxide was prepared. An ammonia gas was provided to the molybdenum oxide at a rate of 0.5 L/min, and the molybdenum oxide was heated at a heating rate of 10° C./min and was annealed at 600° C. for 1 hour to fabricate molybdenum oxynitride from the molybdenum oxide.

The molybdenum oxynitride was annealed in the atmosphere at 350° C. for 30 minutes to fabricate nitrogen-doped molybdenum oxide from the molybdenum oxynitride.

FIG. 14 shows SEM images and TEM images of molybdenum oxide, molybdenum oxynitride, and nitrogen-doped molybdenum oxide according to an embodiment 2 of the inventive concepts, FIG. 15 shows XRD data of molybdenum oxide, molybdenum oxynitride, and nitrogen-doped molybdenum oxide according to the embodiment 2 of the inventive concepts, and FIG. 16 is a graph showing measured specific surface areas of molybdenum oxide and nitrogen-doped molybdenum oxide according to the embodiment 2 of the inventive concepts.

Referring to FIGS. 14 to 16, SEM images and TEM images of the molybdenum oxide, the molybdenum oxynitride and the nitrogen-doped molybdenum oxide according to the embodiment 2 were obtained as shown in FIG. 14, and XRD data thereof were analyzed as shown in FIG. 15.

In addition, grain sizes of the molybdenum oxide, the molybdenum oxynitride and the nitrogen-doped molybdenum oxide according to the embodiment 2 were measured as shown in the following table 4.

TABLE 4

| Classification | Grain size (Å) | Lattice parameter (a * b * c) |
|---|---|---|
| MoO₃ | 616.75 | 3.962 * 13.85 * 3.697 |
| MoO$_x$N$_y$ | 326.69 | 5.813 * 5.813 * 5.624 |
| N—MoO₃ | 266.52 | 3.956 * 13.87 * 3.696 |

As shown in the table 4, the grain sizes of the molybdenum oxide, the molybdenum oxynitride and the nitrogen-doped molybdenum oxide decrease in the order named. In addition, a decrease in grain size in the process of annealing the molybdenum oxide in the ammonia gas atmosphere is greater than a decrease in grain size in the process of annealing the molybdenum oxynitride in the oxygen gas atmosphere.

Referring to FIG. 16, specific surface areas of the molybdenum oxide, the molybdenum oxynitride and the nitrogen-doped molybdenum oxide according to the embodiment 2 were measured as shown in the following table 5.

TABLE 5

| Classification | $a_s$, BET (m²/g) | Total pore volume (p/p0 = 0.990) |
|---|---|---|
| Starting MoO₃ | 5.14 | 0.0212 |
| MoO$_x$N$_y$ | 21.86 | 0.0776 |
| N—MoO₃ | 13.73 | 0.0632 |

As shown in FIG. 16 and the table 5, the specific surface area of the nitrogen-doped molybdenum oxide is somewhat less than that of the molybdenum oxynitride but is significantly greater than that of the molybdenum oxide.

Nitrogen-Doped Tantalum Oxide Structure According to Embodiment 3

Bulk type tantalum oxide was prepared. An ammonia gas was provided to the tantalum oxide at a rate of 0.5 L/min, and the tantalum oxide was heated at a heating rate of 10° C./min and was annealed at 700° C. for 1 hour to fabricate tantalum nitride from the tantalum oxide.

The tantalum nitride was annealed in the atmosphere at 500° C. for 30 minutes to fabricate nitrogen-doped tantalum oxide from the tantalum nitride.

FIG. 17 shows SEM images and TEM images of tantalum oxide, tantalum nitride, and nitrogen-doped tantalum oxide according to an embodiment 3 of the inventive concepts, FIG. 18 shows XRD data of tantalum oxide, tantalum nitride, and nitrogen-doped tantalum oxide according to the embodiment 3 of the inventive concepts, and FIG. 19 is a graph showing measured specific surface areas of tantalum oxide and nitrogen-doped tantalum oxide according to the embodiment 3 of the inventive concepts.

Referring to FIGS. 17 and 18, SEM images and TEM images of the tantalum oxide, the tantalum nitride and the nitrogen-doped tantalum oxide according to the embodiment 3 were obtained as shown in FIG. 17, and XRD data thereof were analyzed as shown in FIG. 18.

In addition, grain sizes of the tantalum oxide, the tantalum nitride and the nitrogen-doped tantalum oxide according to the embodiment 3 were measured as shown in the following table 6.

TABLE 6

| Classification | Grain size (Å) | Lattice parameter (a * b * c) |
| --- | --- | --- |
| Starting $Ta_2O_5$ | 343.71 | 6.209 * 40.30 * 3.884 |
| $Ta_3N_5$ | 122.01 | 3.890* 10.19 * 10.27 |
| N—$Ta_2O_5$ | 50.66 | 6.198 * 40.29 * 3.888 |

As shown in the table 6, the grain sizes of the tantalum oxide, the tantalum nitride and the nitrogen-doped tantalum oxide decrease in the order named. In addition, a decrease in grain size in the process of annealing the tantalum oxide in the ammonia gas atmosphere is greater than a decrease in grain size in the process of annealing the tantalum nitride in the oxygen gas atmosphere.

Referring to FIG. 19, specific surface areas of the tantalum oxide, the tantalum nitride and the nitrogen-doped tantalum oxide according to the embodiment 3 were measured as shown in the following table 7.

TABLE 7

| Classification | $a_s$, BET (m$^2$/g) | Total pore volume (p/p0 = 0.990) |
| --- | --- | --- |
| Starting $Ta_2O_5$ | 13.90 | 0.2168 |
| $Ta_3N_5$ | 29.37 | 0.2731 |
| N—$Ta_2O_5$ | 21.77 | 0.2575 |

As shown in FIG. 19 and the table 7, the specific surface area of the nitrogen-doped tantalum oxide is somewhat less than that of the tantalum nitride but is significantly greater than that of the tantalum oxide.

Nitrogen-Doped Vanadium Oxide Structure According to Embodiment 4

Bulk type vanadium oxide was prepared. An ammonia gas was provided to the vanadium oxide at a rate of 0.5 L/min, and the vanadium oxide was heated at a heating rate of 10° C./min and was annealed at 650° C. for 1 hour to fabricate vanadium oxynitride from the vanadium oxide.

The vanadium oxynitride was annealed in the atmosphere at 350° C. for 15 minutes to fabricate nitrogen-doped vanadium oxide from the vanadium oxynitride.

FIG. 20 shows SEM images and TEM images of vanadium oxide, vanadium oxynitride, and nitrogen-doped vanadium oxide according to an embodiment 4 of the inventive concepts, and FIG. 21 shows XRD data of vanadium oxide, vanadium oxynitride, and nitrogen-doped vanadium oxide according to the embodiment 4 of the inventive concepts. FIG. 22 is a graph showing a measured specific surface area of vanadium oxide according to the embodiment 4 of the inventive concepts, and FIG. 23 is a graph showing a measured specific surface area of nitrogen-doped vanadium oxide according to the embodiment 4 of the inventive concepts.

Referring to FIGS. 20 and 21, SEM images and TEM images of the vanadium oxide, the vanadium oxynitride and the nitrogen-doped vanadium oxide according to the embodiment 4 were obtained as shown in FIG. 20, and XRD data thereof were analyzed as shown in FIG. 21.

In addition, grain sizes of the vanadium oxide, the vanadium oxynitride and the nitrogen-doped vanadium oxide according to the embodiment 4 were measured as shown in the following table 8.

TABLE 8

| Classification | Grain size (Å) | Lattice parameter (a * b * c) |
| --- | --- | --- |
| Starting $V_2O_5$ | 343.71 | 11.51 * 3.565 * 4.381 |
| $VO_xN_y$ | 122.01 | 4.119 * 4.119 * 4.119 |
| N—$V_2O_5$ | 50.66 | 11.51 * 3.568 * 4.383 |

As shown in the table 8, the grain sizes of the vanadium oxide, the vanadium oxynitride and the nitrogen-doped vanadium oxide decrease in the order named. In addition, a decrease in grain size in the process of annealing the vanadium oxide in the ammonia gas atmosphere is greater than a decrease in grain size in the process of annealing the vanadium oxynitride in the oxygen gas atmosphere.

Referring to FIGS. 22 and 23, specific surface areas of the vanadium oxide, the vanadium oxynitride and the nitrogen-doped vanadium oxide according to the embodiment 4 were measured as shown in the following table 9.

TABLE 9

| Classification | $a_s$, BET (m$^2$/g) | Total pore volume (p/p0 = 0.990) |
| --- | --- | --- |
| Starting $V_2O_5$ | 5.24 | 0.00381 |
| $VO_xN_y$ | 25.64 | 0.2084 |
| N—$V_2O_5$ | 18.98 | 0.119 |

As shown in FIGS. 22 and 23 and the table 9, the specific surface area of the nitrogen-doped vanadium oxide is somewhat less than that of the vanadium oxynitride but is significantly greater than that of the vanadium oxide.

Nitrogen-Doped Niobium Oxide Structure According to Embodiment 5

Bulk type niobium oxide was prepared. An ammonia gas was provided to the niobium oxide at a rate of 0.5 L/min, and the niobium oxide was heated at a heating rate of 10° C./min and was annealed at 650° C. for 1 hour to fabricate niobium oxynitride from the niobium oxide.

The niobium oxynitride was annealed in the atmosphere at 500° C. for 15 minutes to fabricate nitrogen-doped niobium oxide from the niobium oxynitride.

FIG. 24 shows SEM images and TEM images of niobium oxide, niobium oxynitride, and nitrogen-doped niobium oxide according to an embodiment 5 of the inventive concepts, FIG. 25 shows XRD data of niobium oxide, niobium oxynitride, and nitrogen-doped niobium oxide according to the embodiment 5 of the inventive concepts, and FIG. 26 is a graph showing measured specific surface areas of niobium oxide and nitrogen-doped niobium oxide according to the embodiment 5 of the inventive concepts.

Referring to FIGS. 24 and 25, SEM images and TEM images of the niobium oxide, the niobium oxynitride and the nitrogen-doped niobium oxide according to the embodiment 5 were obtained as shown in FIG. 24, and XRD data thereof were analyzed as shown in FIG. 25.

In addition, grain sizes of the niobium oxide, the niobium oxynitride and the nitrogen-doped niobium oxide according to the embodiment 5 were measured as shown in the following table 10.

TABLE 10

| Classification | Grain size (Å) | Lattice parameter (a * b * c) |
|---|---|---|
| Starting $Nb_2O_5$ | 489.69 | 6.178 * 29.28 * 3.927 |
| NbON | 293.97 | 4.306 * 4.306 * 4.306 |
| N—$Nb_2O_5$ | 678.01 | 6.186 * 28.95 * 4.010 |

As shown in the table 10, the grain size of the nitrogen-doped niobium oxide is greater than those of the niobium oxide and the niobium oxynitride, unlike the embodiments 1 to 4. In detail, when the niobium oxide is annealed in the ammonia gas atmosphere to fabricate the niobium oxynitride, the grain size is reduced. However, when the niobium oxynitride is annealed in the oxygen gas atmosphere to fabricate the nitrogen-doped niobium oxide, the grain size is greatly increased. Thus, the grain size of the nitrogen-doped niobium oxide is greater than the grain size of the niobium oxide.

Referring to FIG. 26, specific surface areas of the niobium oxide, the niobium oxynitride and the nitrogen-doped niobium oxide according to the embodiment 5 were measured as shown in the following table 11.

TABLE 11

| Classification | $a_s$, BET ($m^2/g$) | Total pore volume (p/p0 = 0.990) |
|---|---|---|
| Starting $Nb_2O_5$ | 2.0844 | 0.01933 |
| NbON | 23.415 | 0.080663 |
| N—$Nb_2O_5$ | 39.812 | 0.1147 |

As shown in FIG. 26 and the table 11, the specific surface area of the nitrogen-doped niobium oxide is greater than that of the niobium oxynitride, unlike the embodiments 1 to 4. Finally, the specific surface area of the nitrogen-doped niobium oxide is significantly greater than that of the niobium oxide.

Nitrogen-Doped Tungsten Oxide Structure According to Embodiment 6

Bulk type tungsten oxide was prepared. An ammonia gas was provided to the tungsten oxide at a rate of 0.5 L/min, and the tungsten oxide was heated at a heating rate of 10° C./min and was annealed at 600° C. for 1 hour to fabricate tungsten oxynitride from the tungsten oxide.

The tungsten oxynitride was annealed in the atmosphere at 400° C. for 30 minutes to fabricate nitrogen-doped tungsten oxide from the tungsten oxynitride.

FIG. 27 shows SEM images and TEM images of tungsten oxide, tungsten oxynitride, and nitrogen-doped tungsten oxide according to an embodiment 6 of the inventive concepts, FIG. 28 shows XRD data of tungsten oxide, tungsten oxynitride, and nitrogen-doped tungsten oxide according to the embodiment 6 of the inventive concepts, and FIG. 29 is a graph showing measured specific surface areas of tungsten oxide and nitrogen-doped tungsten oxide according to the embodiment 6 of the inventive concepts.

Referring to FIGS. 27 and 28, SEM images and TEM images of the tungsten oxide, the tungsten oxynitride and the nitrogen-doped tungsten oxide according to the embodiment 6 were obtained as shown in FIG. 27, and XRD data thereof were analyzed as shown in FIG. 28.

In addition, grain sizes of the tungsten oxide, the tungsten oxynitride and the nitrogen-doped tungsten oxide according to the embodiment 6 were measured as shown in the following table 12.

TABLE 12

| Classification | Grain size (Å) | Lattice parameter (a * b * c) |
|---|---|---|
| Starting $WO_3$ | 2919.98 | 7.320 * 7.546 * 7.702 |
| WON | 139.93 | 4.145 * 4.145 * 4.145 |
| N—$WO_3$ | 128.25 | 7.225 * 7.453 * 7.623 |

As shown in the table 12, the grain sizes of the tungsten oxide, the tungsten oxynitride and the nitrogen-doped tungsten oxide decrease in the order named. In addition, a decrease in grain size in the process of annealing the tungsten oxide in the ammonia gas atmosphere is significantly greater than a decrease in grain size in the process of annealing the tungsten oxynitride in the oxygen gas atmosphere.

Referring to FIG. 29, specific surface areas of the tungsten oxide, the tungsten oxynitride and the nitrogen-doped tungsten oxide according to the embodiment 6 were measured as shown in the following table 13.

TABLE 13

| Classification | $a_s$, BET ($m^2/g$) | Total pore volume (p/p0 = 0.990) |
|---|---|---|
| Starting $WO_3$ | 6.4432 | 0.075277 |
| WON | 23.28 | 0.1747 |
| N—$WO_3$ | 9.7177 | 0.089514 |

As shown in FIG. 29 and the table 13, the specific surface area of the nitrogen-doped tungsten oxide is less than that of the tungsten oxynitride but is greater than that of the tungsten oxide.

Nitrogen-Doped Cobalt Oxide Structure According to Embodiment 7

Bulk type cobalt oxide was prepared. An ammonia gas was provided to the cobalt oxide at a rate of 0.5 L/min, and the cobalt oxide was heated at a heating rate of 10° C./min and was annealed at 290° C. for 1 hour to fabricate nitrogen-doped cobalt monoxide from the cobalt oxide.

The nitrogen-doped cobalt monoxide was annealed in the atmosphere at 550° C. for one and a half hours to fabricate nitrogen-doped cobalt oxide (N-doped $Co_3O_4$) from the nitrogen-doped cobalt monoxide.

FIG. 30 shows SEM images and TEM images of cobalt oxide, nitrogen-doped cobalt monoxide, and nitrogen-doped cobalt oxide according to an embodiment 7 of the inventive concepts, FIG. 31 shows XRD data of cobalt oxide, nitrogen-doped cobalt monoxide, and nitrogen-doped cobalt oxide according to the embodiment 7 of the inventive concepts, and FIG. 32 is a graph showing measured specific surface areas of cobalt oxide and nitrogen-doped cobalt oxide according to the embodiment 7 of the inventive concepts.

Referring to FIGS. 30 and 31, SEM images and TEM images of the cobalt oxide, the nitrogen-doped cobalt monoxide and the nitrogen-doped cobalt oxide according to the embodiment 7 were obtained as shown in FIG. 30, and XRD data thereof were analyzed as shown in FIG. 31.

In addition, grain sizes of the cobalt oxide, the nitrogen-doped cobalt monoxide and the nitrogen-doped cobalt oxide according to the embodiment 7 were measured as shown in the following table 14.

TABLE 14

| Classification | Grain size (Å) | Lattice parameter (a * b * c) |
| --- | --- | --- |
| Starting Co$_3$O$_4$ | 826 | 8.084 * 8.084 * 8.084 |
| N—CoO | 193 | 4.263 * 4.263 * 4.263 |
| N—Co$_3$O$_4$ | 380 | 8.086 * 8.086 * 8.086 |

As shown in the table 14, the grain size of the nitrogen-doped cobalt oxide is less than that of the cobalt oxide and is greater than that of the nitrogen-doped cobalt monoxide, unlike the embodiments 1 to 6. In detail, when the cobalt oxide is annealed in the ammonia gas atmosphere to fabricate the nitrogen-doped cobalt monoxide, the grain size is significantly reduced. However, when the nitrogen-doped cobalt monoxide is annealed in the oxygen atmosphere to fabricate the nitrogen-doped cobalt oxide, the grain size is slightly increased. Finally, the grain size of the nitrogen-doped cobalt oxide is greater than the grain size of the nitrogen-doped cobalt monoxide but is less than the grain size of the cobalt oxide.

Referring to FIG. 32, specific surface areas of the cobalt oxide, the nitrogen-doped cobalt monoxide and the nitrogen-doped cobalt oxide according to the embodiment 7 were measured as shown in the following table 15.

TABLE 15

| Classification | $a_s$, BET (m$^2$/g) | Total pore volume (p/p0 = 0.990) |
| --- | --- | --- |
| Starting Co$_3$O$_4$ | 0.5281 | 0.0025434 |
| N—CoO | 6.8854 | 0.0079326 |
| N—Co$_3$O$_4$ | 0.8518 | 0.0026874 |

As shown in FIG. 32 and the table 15, the specific surface area of the nitrogen-doped cobalt oxide is less than that of the nitrogen-doped cobalt monoxide but is greater than that of the cobalt oxide.

Nitrogen-Doped Iron Oxide Structure According to Embodiment 8

Bulk type iron oxide was prepared. An ammonia gas was provided to the iron oxide at a rate of 0.5 L/min, and the iron oxide was heated at a heating rate of 10° C./min and was annealed at 500° C. for 1 hour to fabricate iron nitride from the iron oxide.

The iron nitride was annealed in the atmosphere at 450° C. for 1 hour to fabricate nitrogen-doped iron oxide from the iron nitride.

FIG. 33 shows SEM images and TEM images of iron oxide, iron nitride, and nitrogen-doped iron oxide according to an embodiment 8 of the inventive concepts, FIG. 34 shows XRD data of iron oxide, iron nitride, and nitrogen-doped iron oxide according to the embodiment 8 of the inventive concepts, and FIG. 35 is a graph showing measured specific surface areas of iron oxide and nitrogen-doped iron oxide according to the embodiment 8 of the inventive concepts.

Referring to FIGS. 33 and 34, SEM images and TEM images of the iron oxide, the iron nitride and the nitrogen-doped iron oxide according to the embodiment 8 were obtained as shown in FIG. 33, and XRD data thereof were analyzed as shown in FIG. 34.

In addition, grain sizes of the iron oxide, the iron nitride and the nitrogen-doped iron oxide according to the embodiment 8 were measured as shown in the following table 16.

TABLE 16

| Classification | Grain size (Å) | Lattice parameter (a * b * c) |
| --- | --- | --- |
| Starting Fe$_2$O$_3$ | 30.652 | 5.038 * 5.038 * 13.773 |
| Fe$_2$N | 64.128 | 4.435 * 5.536 * 4.832 |
| N—Fe$_2$O$_3$ | 29.430 | 5.037 * 5.037 * 13.755 |

As shown in the table 16, the grain size of the nitrogen-doped iron oxide is less than those of the iron oxide and the iron nitride, unlike the embodiments 1 to 7. In detail, when the iron oxide is annealed in the ammonia gas atmosphere to fabricate the iron nitride, the grain size is increased. However, when the iron nitride is annealed in the oxygen atmosphere to fabricate the nitrogen-doped iron oxide, the grain size is significantly reduced. Finally, the grain size of the nitrogen-doped iron oxide is less than the grain sizes of the iron oxide and the iron nitride.

Referring to FIG. 35, specific surface areas of the iron oxide, the iron nitride and the nitrogen-doped iron oxide according to the embodiment 8 were measured as shown in the following table 17.

TABLE 17

| Classification | $a_s$, BET (m$^2$/g) | Total pore volume (p/p0 = 0.990) |
| --- | --- | --- |
| Starting Fe$_2$O$_3$ | 1.8644 | 0.0062971 |
| Fe$_2$N | 3.1233 | 0.014755 |
| N—Fe$_2$O$_3$ | 7.0117 | 0.01987 |

As shown in FIG. 35 and the table 17, the specific surface area of the nitrogen-doped iron oxide is greater than that of the iron nitride, unlike the embodiments 1 to 4, 6 and 7. Finally, the specific surface area of the nitrogen-doped iron oxide is significantly greater than that of the iron oxide.

Nitrogen-Doped Titanium Oxide Structure According to Embodiment 9

To check a phase change of a titanium oxide structure when performing the annealing method according to the embodiment of the inventive concepts, rutile titanium oxides having grain sizes of 178 Å and 170 Å were prepared. An ammonia gas was provided, and the titanium oxides were annealed at 880° C. for 1 hour to fabricate titanium oxynitrides from the titanium oxides.

The titanium oxynitrides were annealed in the atmosphere at 450° C. for 30 minutes to fabricate nitrogen-doped titanium oxides from the titanium oxynitrides.

FIGS. 36 and 37 show SEM images of titanium oxide, titanium oxynitride, and nitrogen-doped titanium oxide according to an embodiment 9 of the inventive concepts, and FIG. 38 shows TEM images and ED patterns of titanium oxide, titanium oxynitride, and nitrogen-doped titanium oxide according to the embodiment 9 of the inventive concepts. FIGS. 39 and 40 are XRD graphs of titanium oxide, titanium oxynitride, and nitrogen-doped titanium oxide according to the embodiment 9 of the inventive concepts. FIGS. 41 and 42 are graphs showing absorbances according to a wavelength of titanium oxide and nitrogen-doped titanium oxide according to the embodiment 9 of the inventive concepts. FIG. 43 is a XRD graph showing a difference in crystallinity between titanium oxide and nitrogen-doped titanium oxide according to the embodiment 9 of the inventive concepts.

Referring to FIGS. 36 to 43, SEM images of the titanium oxides (TiO$_2$) having the grain sizes of 178 Å and 170 Å, the titanium oxynitrides (TiO$_x$N$_y$) and the nitrogen-doped titanium oxides (N—TiO$_2$) according to the embodiment 9 are respectively shown in FIGS. 36 and 37, XRD data thereof are respectively shown in FIGS. 39 and 40, peak sizes thereof are shown in FIG. 43, and absorbances according to a wavelength thereof are respectively shown in FIGS. 41 and 42. In addition, TEM images of the titanium oxides having the grain sizes of 178 Å and 170 Å, the titanium oxynitrides and the nitrogen-doped titanium oxides were obtained to analyze ED patterns as shown in FIG. 38. Furthermore, changes in grain size were measured as shown in the following table 18.

TABLE 18

| Classification | N—TiO$_2$ |
| --- | --- |
| Embodiment 9: Starting TiO$_2$ 178 Å | 152 Å |
| Embodiment 9: Starting TiO$_2$ 170 Å | 157 Å |

According to the embodiments of the inventive concepts, the annealing process in the gas atmosphere including nitrogen and the annealing process in the gas atmosphere including oxygen are sequentially performed on the titanium oxide which has the rutile phase so as to be thermodynamically stable, thereby fabricating the nitrogen-doped titanium oxide which has a thermodynamically metastable state and the anatase phase having reduced crystallinity. In other words, the titanium oxide having the metastable anatase phase may be fabricated from the titanium oxide having the most thermodynamically stable rutile phase.

In addition, a nitrogen-doped metal oxide having a metastable crystal structure may be fabricated by the method of sequentially performing the annealing process in the gas atmosphere including nitrogen and the annealing process in the gas atmosphere including oxygen on a metal oxide having polymorphism (i.e., reversible oxygen and nitrogen exchange reaction).

Lithium Secondary Battery Including Nitrogen-Doped Titanium Oxide According to Embodiment 1

The nitrogen-doped titanium oxide having the anatase phase according to the embodiment 1 was mixed with a binder, and the mixture was coated on a current collector to form a negative electrode. Lithium foil was used as a positive electrode, and 1.0 M LiPF6 dissolved in 1:1 (v/v) ethylene carbonate/diethyl carbonate (EC/DEC) was used as an electrolyte. A lithium secondary battery was fabricated using the negative electrode, the positive electrode, and the electrolyte.

In a comparative example, anatase titanium oxide was prepared, and a lithium secondary battery was fabricated using the same.

FIG. 44 is a graph showing capacity characteristics of lithium secondary batteries including titanium oxide and nitrogen-doped titanium oxide according to the embodiment 1 of the inventive concepts, and FIG. 45 is a graph showing impedances of electrodes including titanium oxide and nitrogen-doped titanium oxide according to the embodiment 1 of the inventive concepts.

Referring to FIGS. 44 and 45, capacity changes according to a charge/discharge cycle number and a current density were measured from the lithium secondary batteries including the nitrogen-doped titanium oxide of the embodiment 1 and the anatase titanium oxide as shown in FIG. 44, and impedances were measured as shown in FIG. 45.

Capacity characteristics of the lithium secondary battery which includes the nitrogen-doped titanium oxide fabricated by sequentially performing the annealing processes on titanium oxide using the gases including nitrogen and oxygen in the embodiment 1 are significantly superior to those of the lithium secondary battery including starting titanium oxide.

In addition, the impedance of the electrode including the nitrogen-doped titanium oxide according to the embodiment 1 is significantly lower than that of an electrode including the starting titanium oxide. In other words, a grain size of the electrode active material may be reduced, and thus lithium ions may be easily diffused to reduce a resistance.

As a result, capacity and life span characteristics of the lithium secondary battery may be effectively improved by using the nitrogen-doped metal oxide according to the embodiments of the inventive concepts as the electrode active material of the lithium secondary battery.

The nitrogen-doped metal oxide according to the aforementioned embodiments of the inventive concepts may be used as negative and positive active materials of the lithium secondary battery. In addition, the lithium secondary battery including the nitrogen-doped metal oxide according to the embodiments of the inventive concepts may be applied to various applications. For example, the lithium secondary battery according to embodiments of the inventive concepts may be applied to an electric car to be described below.

FIG. 46 is a schematic block diagram illustrating an electric car according to some embodiments of the inventive concepts.

An electric car 1000 according to some embodiments of the inventive concepts may include a motor 1010, a transmission 1020, an axle 1030, a battery pack 1040, and at least one of a power controller 1050 or a charger 1060.

The motor 1010 may convert electric energy of the battery pack 1040 into kinetic energy. The motor 1010 may provide the converted kinetic energy to the axle 1030 through the transmission 1020. The motor 1010 may include a single motor or a plurality of motors. For example, in the event that the motor 1010 includes the plurality of motors, the motor 1010 may include a front motor for supplying the kinetic energy to a front axle and a rear motor for supplying the kinetic energy to a rear axle.

The transmission 1020 may be located between the motor 1010 and the axle 1030. The transmission 1020 may change the kinetic energy provided from the motor 1010 to meet a driving environment desired by a driver and may provide the changed kinetic energy to the axle 1030.

The battery pack 1040 may store electric energy provided from the charger 1060 and may provide the stored electric energy to the motor 1010. The battery pack 1040 may directly provide the electric energy to the motor 1010 and/or may provide the electric energy to the motor 1010 through the power controller 1050.

At this time, the battery pack 1040 may include at least one battery cell. In addition, the battery cell may include the lithium secondary battery according to the aforementioned embodiments of the inventive concepts. However, embodiments of the inventive concepts are not limited thereto. In certain embodiments, the battery cell may further include at least one of other various kinds of lithium-based secondary batteries. Meanwhile, the battery cell may mean an individual battery, and the battery pack may mean a battery cell assembly in which battery cells are connected to each other to have desired voltage and/or capacity.

The power controller 1050 may control the battery pack 1040. In other words, the power controller 1050 may control the batter pack 1040 to allow the power transmitted from the battery pack 1040 to the motor 1010 to have desired voltage, current and/or waveform. To achieve this, the power controller 1050 may include at least one of a passive power device or an active power device.

The charger 1060 may receive power from an external power source 1070 illustrated in FIG. 46 and may provide the power to the battery pack 1040. The charger 1060 may wholly control a charging state. For example, the charger 1060 may control on/off of charging and a charging rate.

FIG. 47 is a perspective view illustrating an electric car according to some embodiments of the inventive concepts.

Referring to FIG. 47, the battery pack 1040 may be coupled to a bottom surface of the electric car 1000. For example, the battery pack 1040 may have a width in a width direction of the electric car 1000 and may have a shape extending in a longitudinal direction of the electric car 1000. In more detail, the battery pack 1040 may extend from a front suspension to a rear suspension. Thus, the battery pack 1040 may provide a space capable of packaging a larger number of battery cells. In addition, since the battery pack 1040 is coupled to and disposed at a bottom end of a car body, the center of gravity of the car body may be lowered to improve driving stability of the electric car 1000.

FIG. 48 is a perspective view illustrating a battery pack according to some embodiments of the inventive concepts.

Referring to FIG. 48, the battery pack 1040 may contain a plurality of battery cells 1043.

The battery pack 1040 may include a lower housing 1041 and an upper housing 1042. The lower housing 1041 may include a flange 1044, and bolts 1045 may be fastened to the flange 1044 through holes formed in the upper housing 1042 to couple the lower housing 1041 to the upper housing 1042.

At this time, to improve stability of the battery pack 1040, the lower and upper housings 1041 and 1042 may be formed of a material capable of minimizing permeation of moisture and oxygen. For example, the lower and upper housings 1041 and 1042 may be formed of at least one of aluminum, an aluminum alloy, plastic, or a carbon compound. In addition, an impermeable sealant 1049 may be disposed between the lower housing 1041 and the upper housing 1042.

Furthermore, the battery pack 1040 may further include a component for controlling the battery cells 1043 or for improving stability of the battery cells 1043. For example, the battery pack 1040 may include a control terminal 1047 for controlling the battery cells 1043 disposed in the battery pack 1040. In addition, for example, the battery pack 1040 may include a cooling line 1046 for preventing thermal runaway of the battery cells 1043 or for controlling temperature of the battery cells 1043. Furthermore, for example, the battery pack 1040 may include a gas outlet 1048 for exhausting a gas in the battery pack 1040.

The annealing method and the nitrogen-doped metal oxide structure fabricated thereby in the embodiments of the inventive concepts may be used as the positive active material or the negative active material of the lithium secondary battery and may also be used in other various technical fields such as optical devices, semiconductor devices, and energy devices.

According to the embodiments of the inventive concepts, the metal oxide structure may be annealed in the gas atmosphere including nitrogen to fabricate the metal compound structure, and the metal compound structure may be annealed in the gas atmosphere including oxygen to fabricate the nitrogen-doped metal oxide structure which has a smaller grain size and a greater specific surface area than those of the metal oxide structure.

While the inventive concepts have been described with reference to exemplary embodiments, it will be apparent to those skilled in the art that various changes and modifications may be made without departing from the spirits and scopes of the inventive concepts. Therefore, it should be understood that the above embodiments are not limiting, but illustrative. Thus, the scopes of the inventive concepts are to be determined by the broadest permissible interpretation of the following claims and their equivalents, and shall not be restricted or limited by the foregoing description.

What is claimed is:

1. An annealing method comprising:
   preparing a metal oxide structure;
   first annealing, at a first annealing temperature, the metal oxide structure in a gas atmosphere including nitrogen to fabricate a metal compound structure, an oxygen content of which is lower than that of the metal oxide structure, from the metal oxide structure; and
   second annealing, at a second annealing temperature, the metal compound structure in a gas atmosphere including oxygen to fabricate a nitrogen-doped metal oxide structure, which has a specific surface area greater than that of the metal oxide structure, from the metal compound structure,
   wherein a metal element in the metal oxide is a metal of Group 9 of the periodic table, and the first annealing temperature is lower than the second annealing temperature.

2. The annealing method of claim 1, wherein a grain size of the nitrogen-doped metal oxide structure is less than a grain size of the metal oxide structure.

3. The annealing method of claim 2, wherein a grain size of the metal compound structure is less than the grain size of the metal oxide structure, and
   wherein a specific surface area of the metal compound structure is greater than the specific surface area of the metal oxide structure.

4. The annealing method of claim 3, wherein the grain size of the nitrogen-doped metal oxide structure is less than the grain size of the metal compound structure; and
   wherein the specific surface area of the nitrogen-doped metal oxide structure is less than the specific surface area of the metal compound structure.

5. The annealing method of claim 1, wherein the nitrogen-doped metal oxide structure is a porous structure.

6. The annealing method of claim 1, wherein the metal oxide structure is annealed for a first time, and
   wherein the metal compound structure is annealed for a second time shorter than the first time.

7. An annealing method comprising:
   preparing a metal oxide structure;
   annealing the metal oxide structure in a gas atmosphere including nitrogen to fabricate a metal compound structure, an oxygen content of which is lower than that of the metal oxide structure, from the metal oxide structure; and
   annealing the metal compound structure in a gas atmosphere including oxygen to fabricate a nitrogen-doped metal oxide structure, which has a specific surface area greater than that of the metal oxide structure, from the metal compound structure, wherein the metal oxide structure includes cobalt, and
   wherein the metal compound structure includes cobalt monoxide.

\* \* \* \* \*